United States Patent [19]
Nakatsu et al.

[11] Patent Number: 5,535,244
[45] Date of Patent: Jul. 9, 1996

[54] DIGITAL MODULATING/DEMODULATING APPARATUS AND A DIGITAL DEMODULATING APPARATUS

[75] Inventors: Etsuto Nakatsu, Hirakata; Hiroshi Higashitani, Habikino; Haruo Ohta, Hirakata, all of Japan

[73] Assignee: Matsushita Electric Industrial Co., Ltd., Kadoma, Japan

[21] Appl. No.: 252,902

[22] Filed: Jun. 2, 1994

[30] Foreign Application Priority Data

Jun. 7, 1993 [JP] Japan ................................ 5-135786
Aug. 6, 1993 [JP] Japan ................................ 5-195871

[51] Int. Cl.⁶ .................................................... H04L 5/12
[52] U.S. Cl. .................................... 375/261; 375/340
[58] Field of Search .......................... 375/94, 37, 39, 375/52, 53, 56, 80, 8, 9; 371/43; 329/304, 347, 358, 311, 313; 332/103, 109, 112

[56] References Cited

U.S. PATENT DOCUMENTS

| | | | |
|---|---|---|---|
| 4,346,472 | 8/1982 | Ohkoshi | 375/56 |
| 4,489,418 | 12/1984 | Mazo | 375/27 |
| 4,771,438 | 9/1988 | Nash | 375/261 |
| 5,258,987 | 11/1993 | Wei | 371/43 |

FOREIGN PATENT DOCUMENTS 63-316367  12/1988  Japan.

OTHER PUBLICATIONS

Proakis, "Digital Communications," Second Edition, 1989, pp. 265–272 and 304–322.

*Primary Examiner*—Stephen Chin
*Assistant Examiner*—Huong Luu
*Attorney, Agent, or Firm*—Renner, Otto, Boisselle & Sklar

[57] ABSTRACT

A digital modulating/demodulating apparatus includes a demodulator for demodulating a modulated signal into a demodulated positional signal in response to a receipt of the modulated signal, a decoder for decoding the demodulated positional signal into a digital signal of N bits. A previous signal point on the constellation plane is defined by a previous demodulated positional signal and a current signal point on the constellation plane is defined by a current demodulated positional signal. The decoder outputs a digital signal of N bits, based on en amplitude and a phase of the previous signal point and the amplitude and the phase of the current signal point.

19 Claims, 14 Drawing Sheets

DIGITAL MODULATING/DEMODULATING APPARATUS AND A DIGITAL DEMODULATING APPARATUS

BACKGROUND OF THE INVENTION

1. Field of the Invention

The present invention relates to a digital modulating/demodulating apparatus for transmitting or recording a digital signal and a digital demodulating apparatus.

2. Description of the Related Art

In a conventional digital modulating/demodulating apparatus, 8 phase shift keying (8PSK) is generally used. According to 8PSK, a code of 3 bits (8-ary code) is mapped to one of eight code points on a single circle arranged on a constellation plane. The eight code points are arranged on the single circle with the same interval. The single circle has a center positioned on the origin of the constellation plane.

According to 8PSK, a code point corresponding to a current 8-ary code C(n) is determined in accordance with a code point corresponding to a previous 8-ary code C(n-1) and an angle defined by a value of the current 8-ary code C(n). Such an encoding method in which multiple-valued information is represented by a phase difference between the code point corresponding to the previous 8-ary code C(n-1) and the code point corresponding to the current 8-ary code C(n) is referred to as "a differentially encode". The differentially encode is described in detail in John G. Proakis, "Digital Communications", pp.265–272, McGraw-Hill Book Company, New York. An I-signal and a Q-signal indicating a code point are quadrature modulated into a modulated signal. The modulated signal is transmitted or recorded. Then, the modulated signal is demodulated into a demodulated I-signal and a demodulated Q-signal. The demodulated I-signal and the demodulated Q-signal are decoded into a digital signal by executing the inverse of the process described above.

However, in the conventional modulating/demodulating apparatus in which eight code points are arranged on a single circle with the same interval on a constellation plane, a phase shift of a reproduced carrier is likely to occur due to a Jitter (fluctuation in time-axis) which is caused in the transmission path or the recording/reproducing unit. The phase shift of the reproduced carrier causes a signal point defined by a demodulated I-signal and a demodulated Q-signal shifted in a phase direction. Since adjacent code points on the single circle are only 45 degrees away from each other in the phase direction, an error rate of decoded data is greatly affected by an amount of phase shift of the signal point. As a result, the error rate of the decoded data varies drastically depending upon the amount of phase shift of the signal point.

SUMMARY OF THE INVENTION

The digital modulating/demodulating apparatus of this invention includes: an encoder for outputting a code having a value in response to a digital signal of N bits, a previous code and a current code being output from the encoder in this order, wherein N is an integer satisfying $N \geq 1$; a first memory circuit for storing the previous code until the current code is output from the encoder; a mapping circuit for receiving the previous code from the first memory circuit and the current code from the encoder, for mapping the current code to one of $2^N$ code points arranged on at least one circle having the same center of origin of the constellation plane in accordance with a code point corresponding to the previous code and the value of the current code, and for outputting a positional signal indicating a position of the mapped code point; a quadrature modulator for modulating the positional signal into a modulated signal; a demodulator for demodulating the modulated signal into a demodulated positional signal in response to a receipt of the modulated signal, a previous demodulated positional signal and a current demodulated positional signal being output from the demodulator in this order; and a decoder for decoding the demodulated positional signal into a digital signal of N bits; wherein a previous signal point on the constellation plane is defined by the previous demodulated positional signal, a current signal point on the constellation plane is defined by the current demodulated positional signal, and the previous and current signal points each has an amplitude and a phase, and wherein the decoder outputs a digital signal of N bits, based on the amplitude and the phase of the previous signal point and the amplitude and the phase of the current signal point.

In one embodiment of the invention, the decoder includes: a determining circuit for determining one of the code points corresponding to a signal point defined by the demodulated positional signal in accordance with an amplitude and a phase of the signal point, and for outputting a signal indicating a position of the determined code point, a previous code point corresponding to the previous signal point and a current code point corresponding to the current signal point being determined, and a previous signal indicating a position of the previous code point and a current signal indicating a position of the current code point being output from the determining circuit in this order; a second memory circuit for storing the previous signal until the current signal is output from the determining circuit; and an output circuit for receiving the previous signal from the second memory circuit and the current signal from the determining circuit, for outputting a digital signal of N bits in accordance with the previous signal and the current signal.

In another embodiment of the invention, the decoder includes: a determining circuit for determining a signal point defined by the demodulated positional signal in accordance with an amplitude and a phase of the signal point, and for outputting a signal indicating a position of the determined signal point, a previous signal indicating a position of the previous signal point and a current signal indicating a position of the current signal point being output from the determining circuit in this order; a second memory circuit for storing the previous signal until the current signal is output from the determining circuit; and an output circuit for receiving the previous signal from the second memory circuit and the current signal from the determining circuit, for outputting a digital signal of N bits in accordance with the previous signal and the current signal.

In another embodiment of the invention, the $2^N$ code points are arranged on a plurality of circles having the same center of origin of the constellation plane, adjacent code points of the $2^N$ code points on each circle being away from each other by an angle grater than $(360/2^N)$ degrees, and wherein the mapping circuit maps a code having a value of M to a code point having a phase shifted by $(360/2^N \times M)$ degrees with respect to a code point corresponding to the previous code, and M is an integer satisfying $0 \leq M \leq 2^N - 1$, wherein the decoder includes: a circuit for determining a previous code point corresponding to the previous signal point in accordance with the amplitude and the phase of the previous signal point and for determining a current code point corresponding to the current signal point in accordance with the amplitude and the phase of the current signal point; and a circuit for outputting a code in accordance with the phase difference between the previous code point and the current code point.

In another embodiment of the invention, N is three, the plurality of circles includes an inner circle having a small radius and an outer circle having a large radius, four code points of eight code points are arranged on the outer circle at 0, 90, 180 and 270 degrees and the remaining four code points are arranged on the inner circle at 45, 135, 225 and 315 degrees.

In another embodiment of the invention, N is an integer satisfying $N \geq 2$, the $2^N$ code points are arranged on $2^K$ circles having the same center of the origin of the constellation plane, adjacent code points on each circle of the $2^K$ circles being away from each other by $(360/2^{N-K})$ degrees, K is an integer satisfying $K \geq 1$, wherein the mapping circuit selects one of the $2^K$ circles in accordance with values of predetermined K bits of the digital signal of N bits, and maps a code having a value of M to a code point on the selected circle, the code point having a phase shifted by $(360/2^{N-K} \times M)$ degrees with respect to a code point corresponding to the previous code, and M is an integer satisfying $0 \leq M \leq 2^{N-K}-1$, and wherein the decoder includes: a circuit for determining values of the predetermined K bits of the digital signal of N bits in accordance with the amplitude of the current signal point; a circuit for determining values of the remaining (N–K) bits of the digital signal of N bits in accordance with the phase difference between the previous signal point and the current signal point; and a circuit for outputting a code having a combined value of the predetermined K bits and the remaining (N–K) bits.

In another embodiment of the invention, N is three, K is 1, the plurality of circles includes an inner circle having a small radius and an outer circle having a large radius, four code points of eight code points are arranged on the outer circle at 0, 90, 180 and 270 degrees and the remaining four code points are arranged on the inner circle at 0, 90, 180 and 270 degrees.

In another embodiment of the invention, one of the $2^N$ code points is arranged on the origin of the constellation plane and the remaining code points of the $2^N$ code points are arranged on a single circle having a center of the origin of the constellation plane, wherein the mapping circuit maps a code having a specific value to a code point located at the origin of the constellation plane, and maps a code having a value of M other than the specific value to a code point having a phase shifted by $(360/(2^N-1) \times M)$ with respect to a previous code point on the single circle to which the previous code was mapped most recently, M is an integer satisfying $0 \leq M \leq 2^N-1$, and wherein the decoder includes: a circuit for judging whether the current signal point is located in a predetermined region including the origin of the constellation plane in accordance with the amplitude of the current signal point; a circuit for outputting a code having the specific value, when it is judged that the current signal point is located in the predetermined region, and for outputting a code having a value other than the specific value in accordance with the phase difference between the previous signal point and the current signal point, when it is judged that the current signal point is not located in the predetermined region.

In another embodiment of the invention, N is three, one of eight code points is arranged on the origin, the remaining seven code points are arranged on the single circle at 0, $(360/7 \times 1)$, $(360/7 \times 2)$, $(360/7 \times 3)$, $(360/7 \times 4)$, $(360/7 \times 5)$ and $(360/7 \times 6)$ degrees.

In another embodiment of the invention, the modulated signal output from the quadrature modulator is supplied to the demodulator through a transmission path.

In another embodiment of the invention, the digital modulating/demodulating apparatus further includes: a superposing circuit for superposing a bias signal on the modulated signal; a recording circuit for recording the modulated signal superposed by the superposed circuit on a magnetic recording medium; and a reproducing circuit for reproducing the modulated signal recorded on the magnetic recording medium.

In another aspect of the present invention, a digital demodulating apparatus includes: a demodulator for demodulating a modulated signal into a demodulated positional signal in response to a receipt of the modulated signal, a previous demodulated positional signal and a current demodulated positional signal being output from the demodulator in this order; and a decoder for decoding the demodulated positional signal into a digital signal of N bits, N being an integer satisfying $N \geq 1$; wherein a previous signal point on a constellation plane is defined by the previous demodulated positional signal, a current signal point on the constellation plane is defined by the current demodulated positional signal, and the previous and current signal points each has an amplitude and a phase, and wherein the decoder outputs a digital signal of N bits, based on the amplitude and the phase of the previous signal point and the amplitude and the phase of the current signal point.

In one embodiment of the invention, the decoder includes: a determining circuit for determining a code point of $2^N$ code points arranged on at least one circle having the same center of the origin of a constellation plane, the code point corresponding to a signal point defined by the demodulated positional signal, in accordance with an amplitude and a phase of the signal point, and for outputting a signal indicating a position of the determined code point, a previous code point corresponding to the previous signal point and a current code point corresponding to the current signal point being determined, and a previous signal indicating a position of the previous code point and a current signal indicating a position of the current code point being output from the determining circuit in this order; a second memory circuit for storing the previous signal until the current signal is output from the determining circuit; and an output circuit for receiving the previous signal from the second memory circuit and the current signal from the determining circuit, for outputting a digital signal of N bits in accordance with the previous signal and the current signal.

In another embodiment of the invention, the decoder includes: a determining circuit for determining a signal point defined by the demodulated positional signal in accordance with an amplitude and a phase of the signal point, and for outputting a signal indicating a position of the determined signal point, a previous signal indicating a position of the previous signal point and a current signal indicating a position of the current signal point being output from the determining circuit in this order; a second memory circuit for storing the previous signal until the current signal is output from the determining circuit; and an output circuit for receiving the previous signal from the second memory circuit and the current signal from the determining circuit, for outputting a digital signal of N bits in accordance with the previous signal and the current signal.

In another embodiment of the invention, the $2^N$ code points are arranged on a plurality of circles having the same center of origin of the constellation plane, adjacent code points of the $2^N$ code points on each circle being away from each other by an angle grater than $(360/2^N)$ degrees, and wherein the decoder includes: a circuit for determining a previous code point corresponding to the previous signal point in accordance with the amplitude and the phase of the previous signal point and for determining a current code point corresponding to the current signal point in accordance with the amplitude and the phase of the current signal point; and a circuit for outputting a code in accordance with the phase difference between the previous code point and the current code point.

In another embodiment of the invention, N is three, the plurality of circles includes an inner circle having a small radius and an outer circle having a large radius, four code points are arranged on the outer circle at 0, 90, 180 and 270 degrees and the remaining four code points are arranged on the inner circle at 45, 135, 225 and 315 degrees.

In another embodiment of the invention, the decoder includes: a circuit for determining values of predetermined K bits of the digital signal of N bits in accordance with the amplitude of the current signal point; a circuit for determining values of the remaining (N–K) bits of the digital signal of N bits in accordance with the phase difference between the previous signal point and the current signal point; and a circuit for outputting a code having a combined value of the predetermined K bits and the remaining (N–K) bits.

In another embodiment of the invention, N is three, K is 1, the plurality of circles includes an inner circle having a small radius and an outer circle having a large radius, four code points are arranged on the outer circle at 0, 90, 180 and 270 degrees and the remaining four code points are arranged on the inner circle at 0, 90, 180 and 270 degrees.

In another embodiment of the invention, the decoder includes: a circuit for judging whether the current signal point is located in a predetermined region including the origin of the constellation plane in accordance with the amplitude of the current signal point; and a circuit for outputting a code having a specific value, when it is judged that the current signal point is located in the predetermined region, and for outputting a code having a value other than the specific value in accordance with the phase difference between the previous signal point and the current signal point, when it is judged that the current signal point is not located in the predetermined region.

In another embodiment of the invention, N is three, one of eight code points is arranged on the origin, the remaining seven code points are arranged on the single circle at 0, (360/7×1), (360/7×2), (360/7×3), (360/7×4), (360/7×5) and (360/7×6) degrees.

In another embodiment of the invention, the demodulating apparatus further includes a reproducing circuit for reproducing a modulated signal recorded on a magnetic recording medium, and wherein the modulated signal is supplied to the demodulator.

Thus, the invention described herein makes possible the advantage of providing a digital modulating/demodulating apparatus and a digital demodulating apparatus capable of keeping the error rate of the decoded data extremely low even if a phase shift of the reproduced carrier, due to a jitter (fluctuation in time-axis), causes a phase shift of the signal point.

This and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
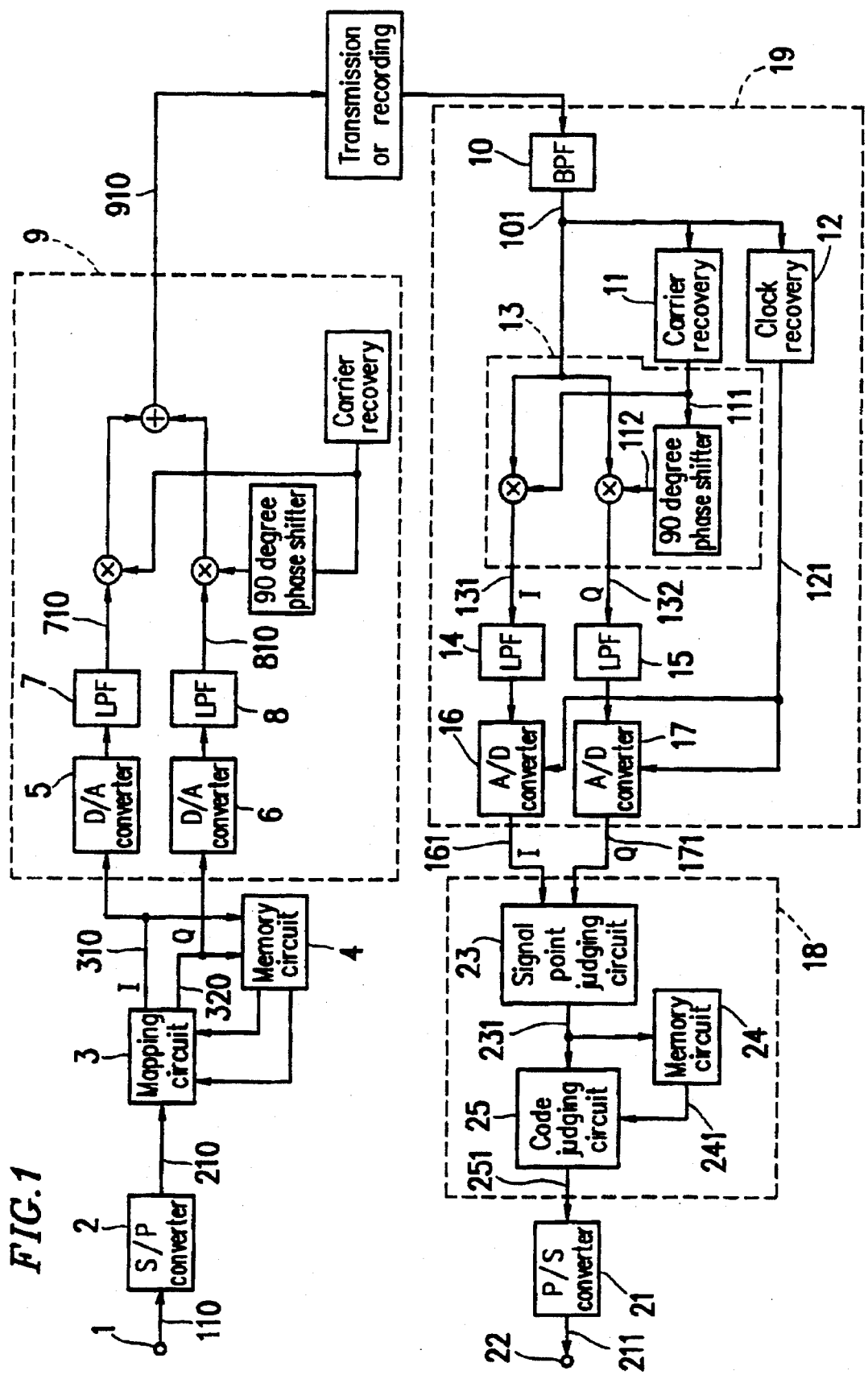
FIG. 1 is a block diagram showing the structure of a digital modulating/demodulating apparatus of a first example according to the present invention.

FIG. 1 shows the structure of a digital modulating/demodulating apparatus of a first example according to the present invention. The digital modulating/demodulating apparatus includes a modulating unit for converting a digital signal into a modulated signal and a demodulating unit for converting the modulated signal into a digital signal.

The modulating unit includes a S/P converter 2, a mapping circuit 3, a memory circuit 4 and a quadrature modulator 9.

The demodulating unit includes a demodulator 19, a decoder 18 and a P/S converter 21.

Referring to FIG. 1, an operation of the modulating/demodulating apparatus will be described below. Serial data 110 is input to the S/P converter 2 through an input terminal 1. The S/P converter 2 converts serial data 110 into parallel data 210 of 3 bits. The parallel data 210 of 3 bits (i.e. 8-ary code C(n)) is input to the mapping circuit 3. The mapping circuit 3 maps the 8-ary code C(n) to one of 8 code points (A to H) shown in FIG. 2 and outputs an I-signal and a Q-signal representing the code point to which the 8-ary code C(n) has been mapped.

Figure 2:
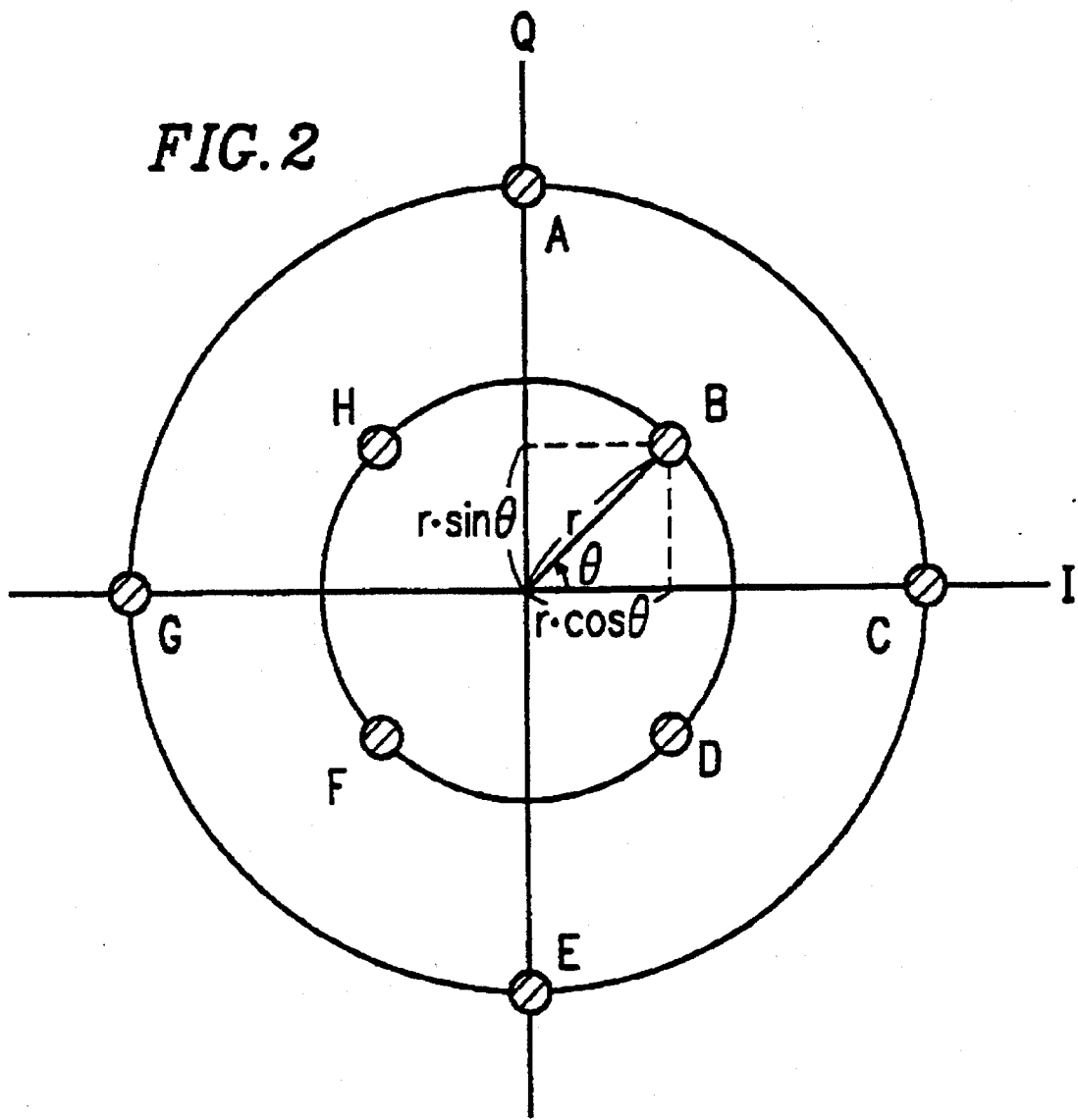
FIG. 2 is a schematic view of an arrangement of eight code points on the constellation plane in the mapping circuit.

FIG. 2 shows an example of an arrangement of eight code points on the constellation plane in the mapping circuit 3. Four points A, C, E and G are located on an outer circle at 0, 90, 180 and 270 degrees, respectively. The remaining four points B, D, F and H are located on an inner circle at 45, 135, 225 and 315 degrees, respectively. The radius of the outer circle is greater than that of the inner circle. The outer and inner circles have the same center which is positioned on the origin of the constellation plane.

In FIG. 2, a horizontal axis is referred to as an in-phase axis (hereinafter, an I-axis) and a vertical axis is referred to as a quadrature-phase axis (hereinafter, a Q-axis). A radius r of the circle represents the amplitude of the code point. An angle $\theta$ from the I-axis represents the phase of the code point. An I-signal is defined as an I-component of the code point on the I-axis (i.e. $r \cdot \cos\theta$). A Q-signal is defined as an Q-component of the code point on the Q-axis (i.e. $r \cdot \sin\theta$). Therefore, the code point is represented by the corresponding I-signal and Q-signal.

Table 1 shows a mapping rule for mapping the code C(n) to one of 8 code points.

TABLE 1

| Current code C (n) | The angle difference between a previous code point and a current code point (degree) |
| --- | --- |
| 0 | 0 |
| 1 | (360 × 1/8) |
| 2 | (360 × 2/8) |
| 3 | (360 × 3/8) |
| 4 | (360 × 4/8) |
| 5 | (360 × 5/8) |
| 6 | (360 × 6/8) |
| 7 | (360 × 7/8) |

When a code C(n) is currently input to the mapping circuit 3, the mapping circuit 3 maps the current code C(n) to one of the code points in accordance with a code point corresponding to a previous code C(n-1) and an angle defined by a value of the current code C(n), and outputs an I-signal and a Q-signal representing the mapped code point. The angle corresponding to the current code C(n) is shown in Table 1. An I-signal and a Q-signal representing a code point corresponding to the previous code C(n-1) are stored in the memory circuit 4. These I-signal and Q-signal corresponding to the previous code C(n-1) and the current code C(n) are input to the mapping circuit 3 simultaneously.

For example, it is assumed that a first code having a value of 2, a second code having a value of 5 and a third code having a value of 0 are input to the mapping circuit 3 in this order and that a previous code of the first code was mapped to code point A shown in FIG. 2. In this case, the first code is mapped to code point C, which is shifted in a clockwise direction by (360×2/8) degrees with respect to code point A, and an I-signal and a Q-signal representing code point C are outputted by the mapping circuit 3. The second code is mapped to code point H, which is shifted in a clockwise direction by (360×5/8) degrees with respect to code point C, and an I-signal and a Q-signal representing code point H are outputted by the mapping circuit 3. The third code is mapped to code point H, which is shifted by 0 degrees with respect to code point H, and an I-signal and a Q-signal representing code point H are outputted by the mapping circuit 3.

The mapping circuit 3 can be realized by a ROM (read only memory), in which the levels of the I-signal and the Q-signal to be output are stored for any combination of parallel data 210 of 3 bits with the I-signal and the Q-signal read from the memory circuit 4.

The I-signal 310 and the Q-signal 320 output from the mapping circuit 3 are input to the quadrature modulator 9. In the quadrature modulator 9, The I-signal 310 and the Q-signal 320 are converted into analog signals. The analog signals 710 and 810 passed through low-pass filters 7 and 8 are amplitude modulated by the use of carriers, thereby generating a modulated signal 910.

The modulated signal 910 is input to a bandpass filter (BPF) 10 through a transmission path. A transmission in the transmission path is not limited to a specific transmission. For example, the transmission is made using radio communications or cable communications. The modulated signal passed through the BPF 10 is input to a carrier recovery 11, a clock recovery 12 and a quadrature detector 13.

The carrier recovery 11 generates a reproduced carrier 111 for demodulation. For example, a decision-feedback PLL may be used as the carrier recovery 11 (See, John G. Proakis, "Digital Communications", pp.304–318, McGraw-Hill Book Company, New York).

The clock recovery 12 generates a reproduced clock signal 121 for defining a detecting timing. In order to generate the reproduced clock signal 121, for example, self-synchronization method based on non-linear operations is used (See, John G. Proakis, "Digital Communications", pp.318–322, McGraw-Hill Book Company, New York).

The quadrature detector 13 generates a demodulated I-signal 131 and a demodulated Q-signal 132 by quadrature detecting the modulated signal 101 by the use of the reproduced carrier 111 and a signal 112 obtained by shifting a phase of the reproduced carrier 111 by 90 degrees.

The demodulated I-signal 131 and the demodulated Q-signal 132 are input to A/D converters 16 and 17 through low-pass filters (LPFs) 14 and 15. The A/D converters 16 and 17 convert the I-signal and the Q-signal into a digital I-signal 161 and a digital Q-signal 171 in response to the reproduced clock signal 121 from clock recovery 12.

The digital I-signal 161 and the digital Q-signal 171 are input to the decoder 18. The decoder 18 includes a signal point judging circuit 23, a memory circuit 24 and a code judging circuit 25.

The signal point judging circuit 23 determines which one of the eight code points corresponds to a signal point represented by the I-signal 161 and the Q-signal 171 in accordance with the amplitude and the phase of the signal point. A signal 231 representing the code point determined by the signal point judging circuit 23 is input to the memory circuit 24 and the code judging circuit 25.

The signal point judging circuit 23 can be realized by a ROM (read only memory), in which the judgment result is stored for any combination of the I-signal 161 and the Q-signal 171.

The memory circuit 24 delays the signal 231 by one code period by holding the signal 231 during one code period. "One code period" means the period from receiving a signal 231 to receiving a next signal 231.

When the signal 231 is currently input to the code judging circuit 25, the code judging circuit 25 reads a previous signal 241 stored in the memory circuit 24 and determines a 8-ary code 251 in accordance with the phase difference between the previous signal 241 and the current signal 231. The code judging circuit 25 can be realized by a ROM (read only memory).

Figure 3:
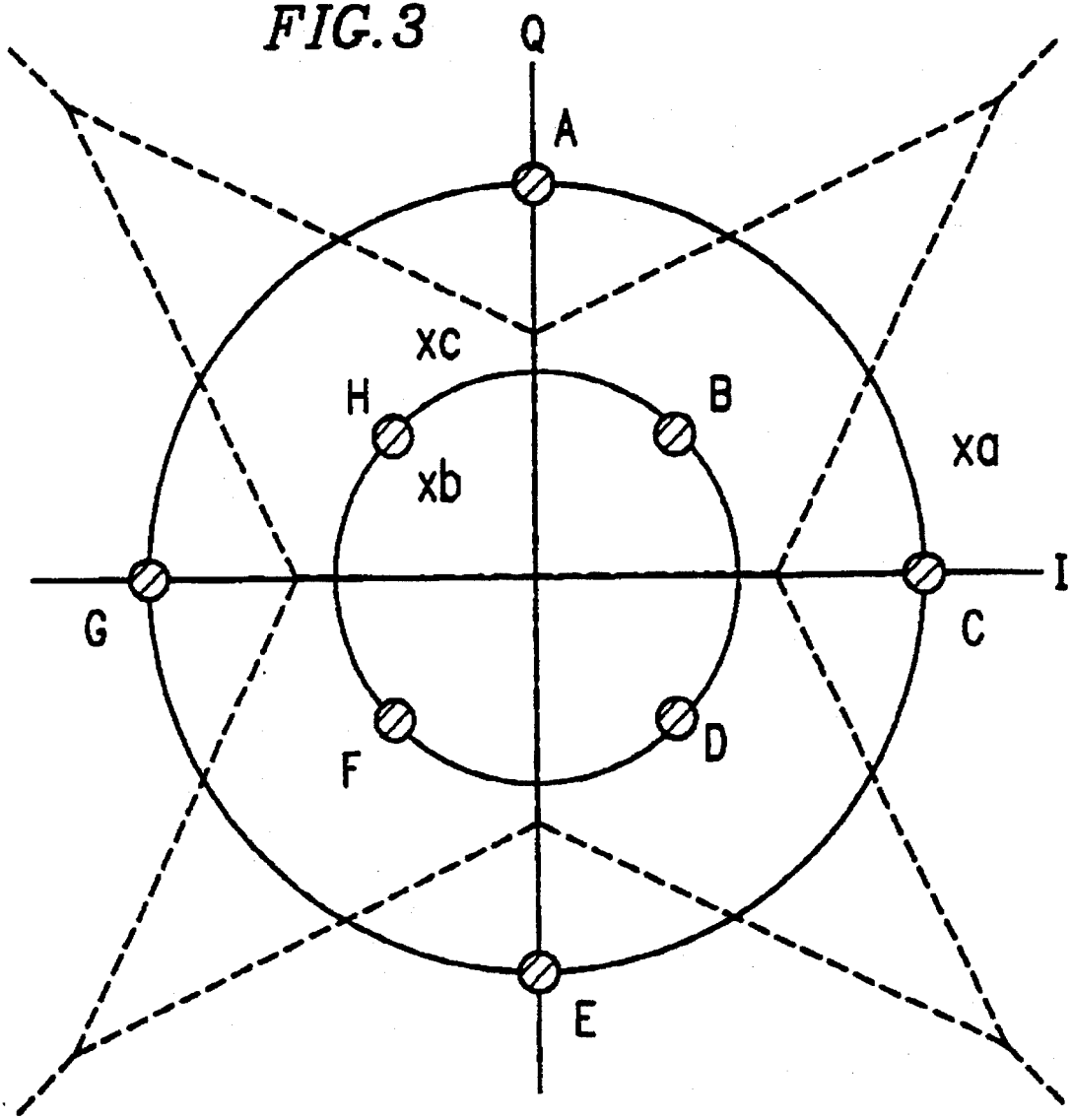
FIG. 3 is a schematic view of the division of the constellation plane into 8 plurality of regions.

FIG. 3 shows an example of the division of the constellation plane into a plurality of regions. In FIG. 3, the constellation plane is divided into eight regions, each of the eight regions includes one of eight code points (A to H) as a representative point of the region. Broken lines show borders between adjacent regions. Typically, a border between a region including a first code point and another adjacent region including a second code point is arranged so that the distance from the first code point to the border is substantially equal to the distance from the second code point to the border.

Referring to FIG. 3, operations of the signal point judging circuit 23, the memory circuit 24 and the code judging circuit 25 will be described in more detail below. It is assumed that I and Q signals representing a first signal point (a), a second signal point (b) and a third signal point (c) are input to the signal point judging circuit 23 in this order, and that the code point stored in the memory circuit 24 is code point A shown in FIG. 3.

In this case, the first signal point (a) is judged to be code point C by the signal point judging circuit 23, because the first signal point (a) is included in the same region as code point C. The code judging circuit 25 outputs a code having a value of 2, because code point C is shifted in clockwise direction by 90 degrees with respect to code point A. Then, the content of memory circuit 24 is updated into code point C. The second signal point (b) is judged to be code point H by the signal point judging circuit 23, because the second signal point (b) is included in the same region as code point H. The code judging circuit 25 outputs a code having a value of 5, because code point H is shifted in clockwise direction by 225 degrees with respect to code point C. Then, the content of memory circuit 24 is updated into code point H. The third signal point (c) is judged to be code point H by the signal point judging circuit 23, because the third signal point (c) is included in the same region as code point H. The code judging circuit 25 outputs a code having a value of 0, because code point H is shifted by 0 degrees with respect to code point H.

The 8-ary code 251 (i.e. a digital signal of 3 bits) output from the code judging circuit 25 is converted into serial data 221 by a P/S converter 21.

In the present embodiment, the number of bits is three, and the number of code values is eight for explanation. However, it is to be understood that the number of bits and the number of code values as mentioned above are by way of example and the invention is not intended to be limited thereto.

For example, $2^N$ code points may be arranged on a plurality of circles having the same center of origin of the constellation plane, and adjacent code points of the $2^N$ code points on each circle may be away from each other by an angle greater than $(360/2^N)$ degrees. In this case, the mapping circuit 3 maps a code having a value of M to a code point having a phase shifted by $(360/2^N \times M)$ degrees with respect to a code point corresponding to the previous code. Wherein, M is an integer satisfying $0 \leq M \leq 2^N-1$.

Figure 4:
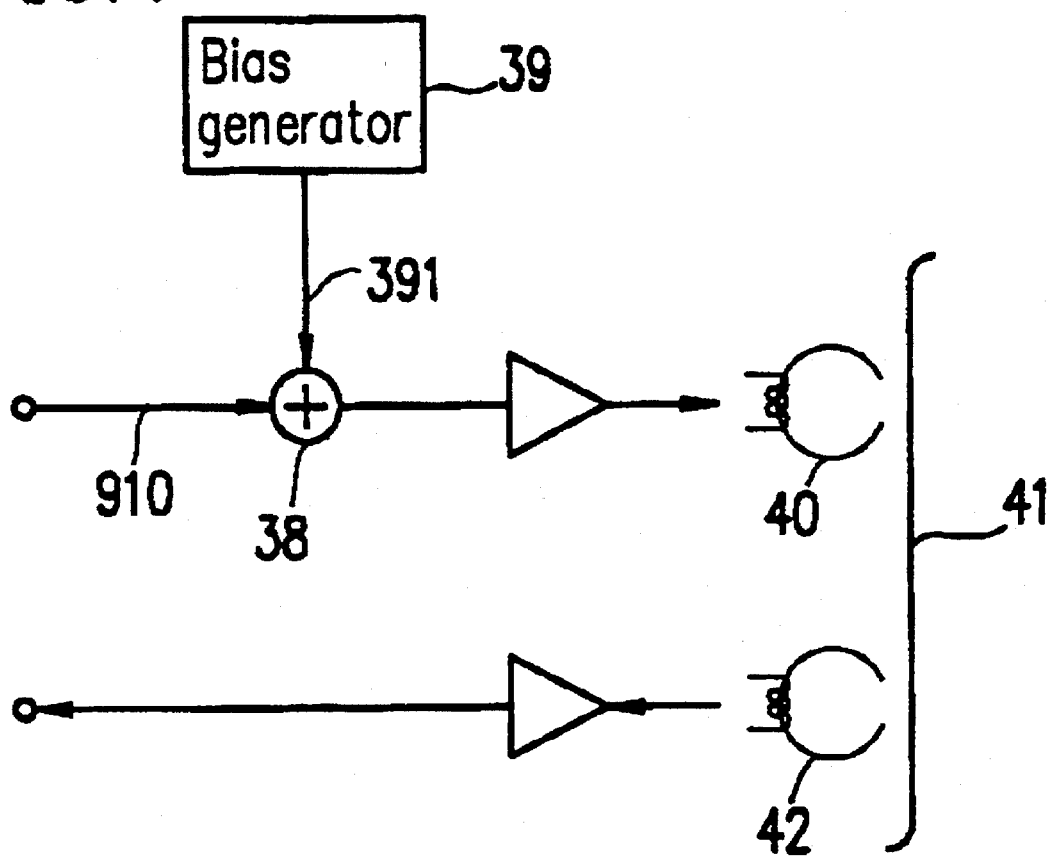
FIG. 4 is a block diagram showing the structure of a recording/reproducing unit.

The digital recording/reproducing apparatus according to the present invention is obtained by adding a recoding/reproducing unit shown in FIG. 4 to the structure shown in FIG. 1. The recording/reproducing unit includes an adder 38, a bias generator 39, a recording head 40 and a reproducing head 42. Bias 391 having a high frequency from the bias generator 39 is superposed on the modulated signal 910 by the adder 38. The superposed modulated signal is recorded on a magnetic recording material 41 through a recording amplifier and the recording head 40. A reproduced signal from the recording medium 41 is input to the BPF 10 through the reproducing head 42 and a reproducing amplifier.

As described above, according to the digital modulating/demodulating apparatus and the digital recording/reproducing apparatus of the first example according to the present invention, a signal point is judged based on the phase and the amplitude of the signal point in the decoder. As a result, the error rate of the decoded data is kept extremely low even if a phase shift of the reproduced carrier, due to a jitter (fluctuation in time-axis), causes a phase shift of the signal point.

Example 2

A digital modulating/demodulating apparatus of a second example according to the present invention will be described below. The structure of the digital modulating/demodulating apparatus of this example is the same as that of the first example except for the decoder 18. Therefore, only the structure of the decoder 18 will be described with reference to FIG. 5.

Figure 5:
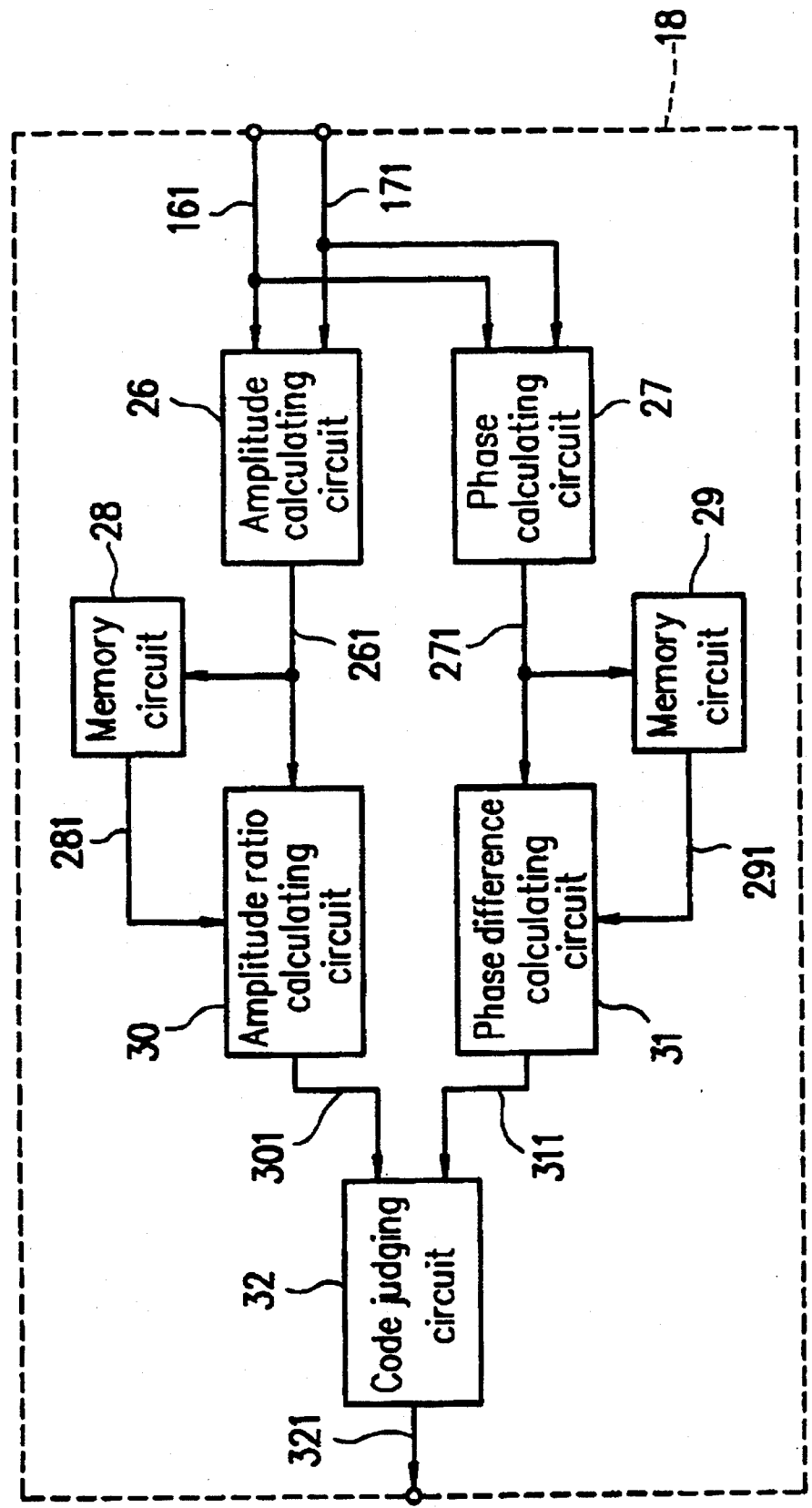
FIG. 5 is a block diagram showing the structure of a decoder in a second example according to the present invention.

FIG. 5 shows the structure of the decoder 18 of this example. The decoder 18 includes an amplitude calculating circuit 26, a phase calculating circuit 27, memory circuits 28 and 29, an amplitude ratio calculating circuit 30, a phase difference calculating circuit 31 and a code judging circuit 32. The amplitude calculating circuit 26, the memory circuit 28 and the amplitude ratio calculating circuit 30 are used to calculate a change in amplitude between a previous signal point and a current signal point. The phase calculating circuit 27, the memory circuit 29 and the phase difference calculating circuit 31 are used to calculate a change in phase between a previous signal point and a current signal point.

The digital I-signal 161 and the digital Q-signal 171 output from the A/D converters 16 and 17 are input to the amplitude calculating circuit 26. The amplitude calculating circuit 26 calculates the amplitude of a signal point represented by the digital I-signal 161 and the digital Q-signal 171, and outputs a signal 261 indicating the calculated amplitude. The signal 261 is input to the memory circuit 28 and the amplitude ratio calculating circuit 30. The memory circuit 28 holds the signal 261 until the memory circuit 28 receives a next signal 261, thereby delaying the signal 261 by one code period. As a result, the signal 281 output from the memory circuit 28 is delayed by one code period compared with the signal 261. The amplitude ratio circuit 30 calculates an increasing/decreasing ratio of the current signal 261 to the previous signal 281, and outputs a signal 301 indicating the calculated ratio. The signal 301 is input to the code judging circuit 32.

The digital I-signal 161 and the digital Q-signal 171 output from the A/D converters 16 and 17 are also input to the phase calculating circuit 27. The phase calculating circuit 27 calculates the phase of a signal point represented by the digital I-signal 161 and the digital Q-signal 171, and outputs a signal 271 indicating the calculated phase. The signal 271 is input to the memory circuit 29 and the phase difference calculating circuit 31. The memory circuit 29 holds the signal 271 until the memory circuit 29 receives a next signal 271, thereby delaying the signal 271 by one code period. As a result, the signal 291 output from the memory circuit 29 As delayed by one code period compared with the signal 271. The phase difference calculating circuit 31 calculates a difference between the current signal 271 and the previous signal 291, and outputs a signal 311 indicating the calculated difference. The signal 311 is input to the code judging circuit 32.

The code judging circuit 32 determines a code in accordance with the signal 301 indicating the calculated ratio and the signal 311 indicating the calculated difference, and outputs a signal 321 indicating the determined code.

The amplitude calculating circuit 26 and the phase calculating circuit 27 can be realized by ROMs (read only memories), in which the amplitude or phase of the signal point is stored for any combination of the I-signal 161 and the Q-signal 171. The amplitude ratio calculating circuit 30, the phase difference calculating circuit 31 and the code judging circuit 32 can also be realized by ROMs (read only memories).

The 8-ary code 321 (i.e. a digital signal of 3 bits) output from the code judging circuit 32 is converted into serial data 211 by the P/S converter 21.

In the present embodiment, the number of bits is three, and the number of code values is eight for explanation. However, it is to be understood that the number of bits and the number of code values as mentioned above are by way of example and the invention is not intended to be limited thereto.

The digital recording/reproducing apparatus according to the present invention is obtained by adding a recoding/reproducing unit shown in FIG. 4 to the structure shown in FIGS. 1 and 5.

As described above, according to the digital modulating/demodulating apparatus and the digital recording/reproducing apparatus of the second example according to the present invention, a signal point is judged based on the phase and the amplitude of the signal point in the decoder. As a result, the error rate of the decoded data is kept extremely low even if a phase shift of the reproduced carrier, due to a jitter (fluctuation in time-axis), causes a phase shift of the signal point. Furthermore, the signal point is not coupled to one of code points in the decoder. Instead, a code is determined in the decoder, based on relative changes in phase and amplitude between the previous signal point and the current signal point. As a result, the error rate of the decoded data is kept extremely low even if the reproduced carrier is unusual.

Example 3

Figure 6:
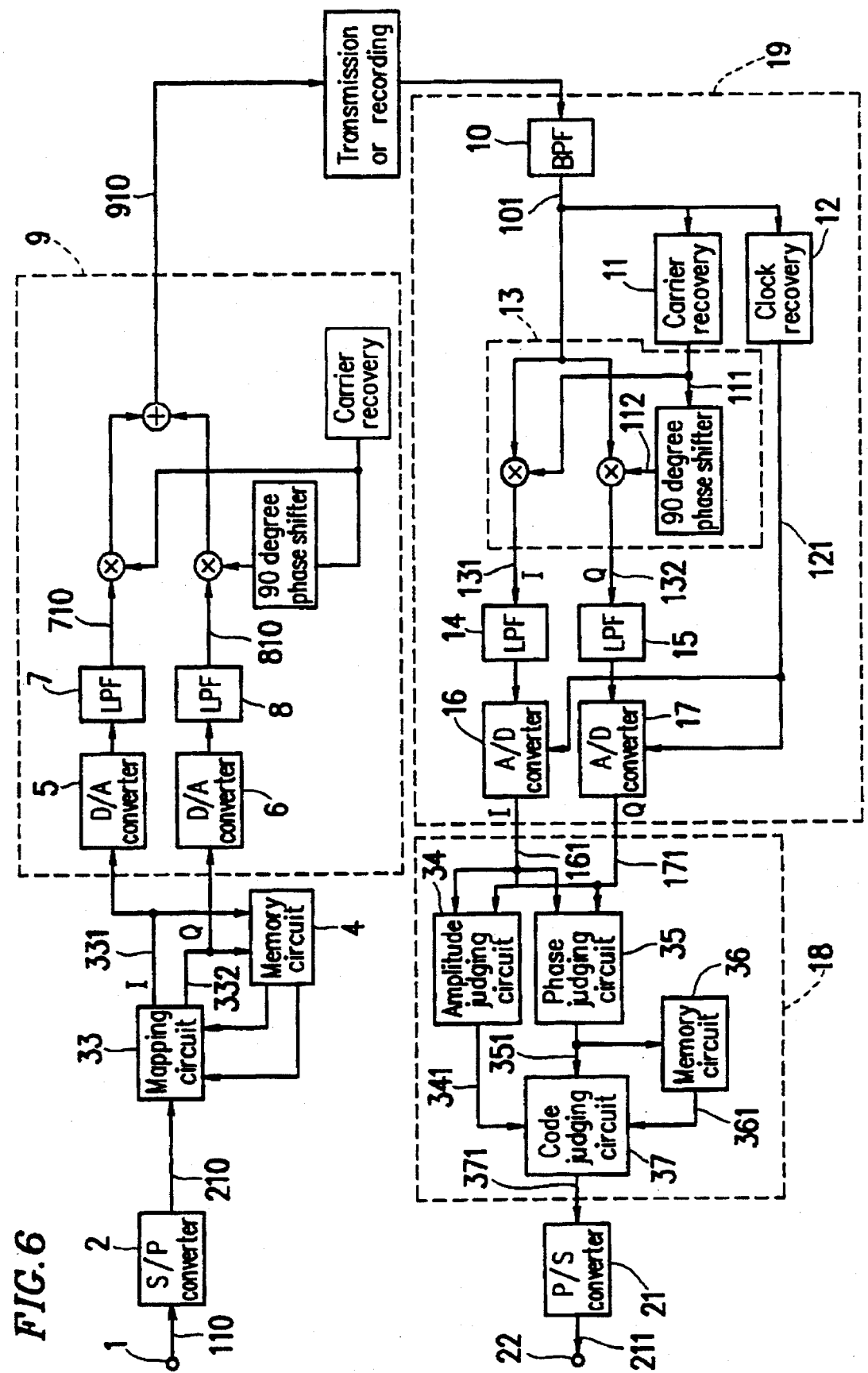
FIG. 6 is a block diagram showing the structure of a digital modulating/demodulating apparatus of a third example according to the present invention.

FIG. 6 shows a structure of a digital modulating/demodulating apparatus of a third example according to the present invention. The digital modulating/demodulating apparatus includes a modulating unit for converting a digital signal into a modulated signal and a demodulating unit for converting the modulated signal into a digital signal.

The modulating unit includes a S/P converter 2, a mapping circuit 33, a memory circuit 4 and a quadrature modulator 9.

The demodulating unit includes a demodulator 19, a decoder 18 and a P/S converter 21.

Referring to FIG. 6, an operation of the modulating/demodulating apparatus will be described below. Serial data 110 is input to the S/P converter 2 through an input terminal 1. The S/P converter 2 converts serial data 110 into parallel data 210 of 3 bits. The parallel data 210 of 3 bits (i.e. 8-ary code C(n)) is input to the mapping circuit 33. The mapping circuit 33 maps the 8-ary code C(n) to one of 8 code points (A to H) shown in FIG. 7 and outputs an I-signal and a Q-signal representing the code point to which the 8-ary code C(n) has been mapped.

Figure 7:
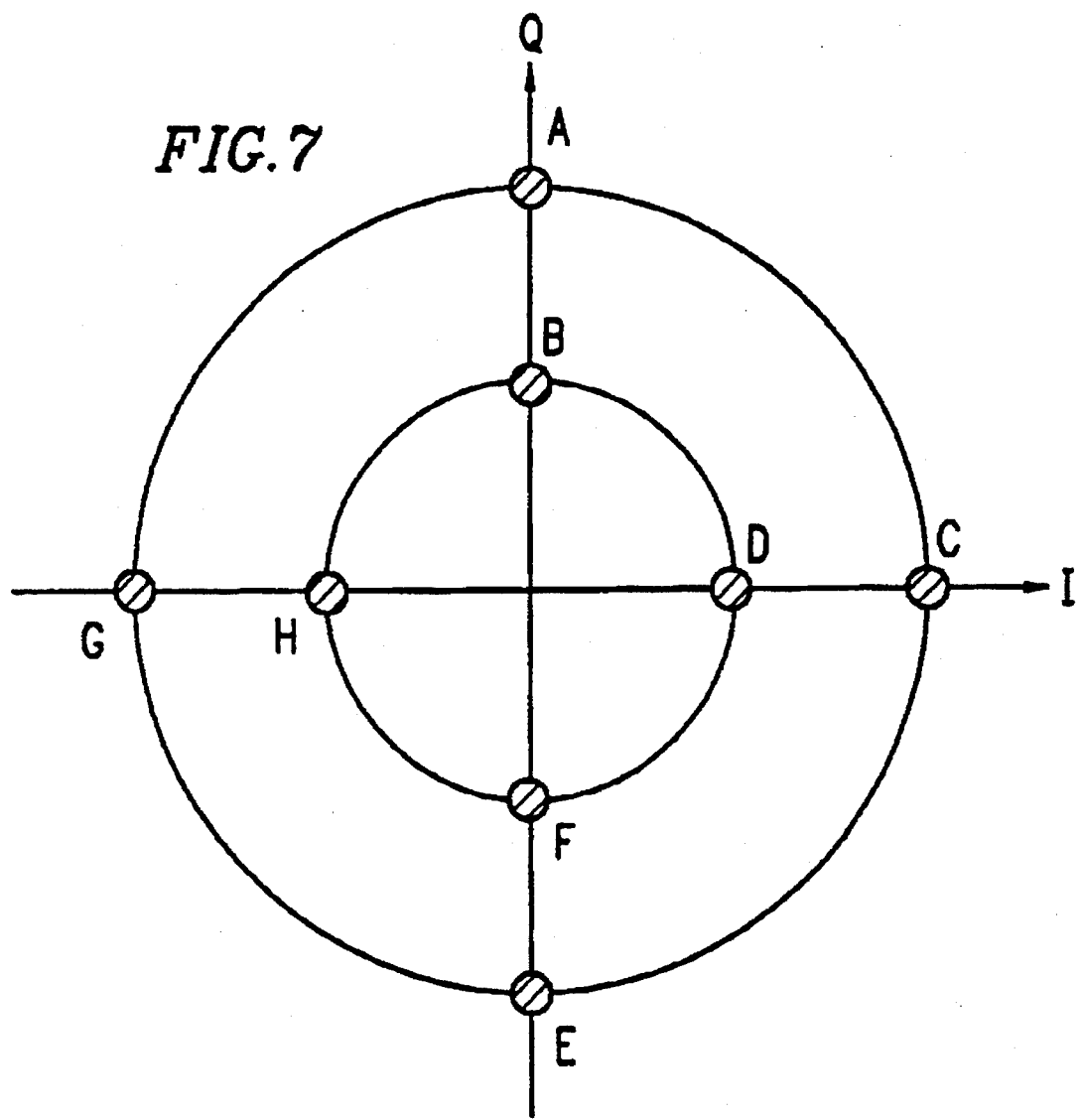
FIG. 7 is a schematic view of an arrangement of eight code points on the constellation plane in the mapping circuit.

FIG. 7 shows an example of an arrangement of eight code points on the constellation plane in the mapping circuit 33. Four points A, C, E and G are located on an outer circle at 0, 90, 180 and 270 degrees, respectively. The remaining four points B, D, F and H are located on an inner circle at 0, 90, 180 and 270 degrees, respectively. The radius of the outer circle is greater than that of the inner circle. The outer and inner circles have the same center which is positioned on the origin of the constellation plane.

Table 2 shows a mapping rule for mapping the code C(n) to one of 8 code points shown in FIG. 7.

TABLE 2

| Current code C (n) | The position of a current code point relative to the position of a previous code point |
| --- | --- |
| 0 | A code point on the outer circle rotated by 0 degree |
| 1 | A code point on the outer circle rotated by (360 × ¼) degree |
| 2 | A code point on the outer circle rotated by (360 × 2/4) degree |
| 3 | A code point on the outer circle rotated by (360 × ¾) degree |
| 4 | A code point on the inner circle rotated by 0 degree |
| 5 | A code point on the inner circle rotated by (360 × ¼) degree |
| 6 | A code point on the inner circle rotated by (360 × 2/4) degree |
| 7 | A code point on the inner circle rotated by (360 × ¾) degree |

When a code C(n) of 3 bits is currently input to the mapping circuit 33, the mapping circuit 33 selects one of the outer and inner circles shown in FIG. 7 in accordance with a value of one predetermined bit of 3 bits. Then, the mapping circuit 33 maps the current code C(n) to one of the code points on the selected circle in accordance with a code point corresponding to a previous code C(n-1) and an angle defined by a value of the current code C(n), and outputs an I-signal and a Q-signal representing the mapped code point. The selection of one of the outer and inner circles and the angle corresponding to the current code C(n) is shown in Table 2. An I-signal and a Q-signal representing a code point corresponding to the previous code C(n-1) are stored in the memory circuit 4. These I-signal and Q-signal corresponding to the previous code C(n-1) and the current code C(n) are input to the mapping circuit 33 simultaneously.

For example, it is assumed that a first code having a value of 2, a second code having a value of 5 and a third code having a value of 0 are input to the mapping circuit 33 in this order and that a code previous to the first code was mapped to code point A shown in FIG. 7. It is also assumed that the mapping circuit 33 selects one of the code points on the outer circle, if the most significant bit of the code is "0", and that the mapping circuit 33 selects one of code points on the inner circle, if the most significant bit of the code is "1".

In this case, the first code is mapped to code point E on the outer circle, which is shifted in a clockwise direction by (360×2/4) degrees with respect to code point A, and an I-signal and a Q-signal representing code point E are outputted by the mapping circuit 33. The second code is mapped to code point H in the inner circle, which is shifted in a clockwise direction by (360×1/4) degrees with respect to code point E, and an I-signal and a Q-signal representing code point H are outputted by the mapping circuit 33. The third code is mapped to code point G on the outer circle, which is shifted by 0 degrees with respect to code point H, and an I-signal and a Q-signal representing code point G are outputted by the mapping circuit 33.

The mapping circuit 33 can be realized by a ROM (read only memory), in which the levels of the I-signal and the Q-signal to be output are stored for any combination of parallel data 210 of 3 bits with the I-signal and the Q-signal read from the memory circuit 4.

The I-signal 331 and the Q-signal 332 output from the mapping circuit 33 are input to the quadrature modulator 9.

In the quadrature modulator 9, the I-signal 331 and the Q-signal 332 are converted into analog signals. The analog signals 710 and 810 passed through low-pass filters 7 and 8 are amplitude modulated by the use of carriers, thereby generating a modulated signal 910.

The modulated signal 910 is input to a bandpass filter (BPF) 10 through a transmission path. A transmission in the transmission path is not limited to a specific transmission. For example, the transmission is made using radio communications or cable communications. The modulated signal passed through the BPF 10 is input to a carrier recovery 11, a clock recovery 12 and a quadrature detector 13.

The carrier recovery 11 generates a reproduced carrier 111 for demodulation. The clock recovery 12 generates a reproduced clock signal 121 for defining a detecting timing.

The quadrature detector 13 generates a demodulated I-signal 131 and a demodulated Q-signal 132 by quadrature detecting the modulated signal 101 by the use of the reproduced carrier 111 and a signal 112 obtained by shifting a phase of the reproduced carrier 111 by 90 degrees.

The demodulated I-signal 131 and the demodulated Q-signal 132 are input to A/D converters 16 and 17 through low-pass filters (LPFs) 14 and 15. The A/D converters 16 and 17 convert the I-signal and the Q-signal into a digital I-signal 161 and a digital Q-signal 171 in response to the reproduced clock signal 121 from clock recovery 12.

The digital I-signal 161 and the digital Q-signal 171 are input to an amplitude judging circuit 34 and a phase judging circuit 35 of the decoder 18.

The amplitude judging circuit 34 determines which one of the outer and inner circles corresponds to a signal point represented by the I-signal 161 and the Q-signal 171 in accordance with the amplitude of the signal point, and outputs a signal 341 indicating the determined circle. The phase judging circuit 35 determines which one of four code points on the determined circle corresponds to a signal point represented by the I-signal 161 and the Q-signal 171 in accordance with the phase of the signal point, and outputs a signal 351 indicating the phase of the determined code point. The signal 351 from the phase judging circuit 35 is input to the memory circuit 36 and the code judging circuit 37.

The amplitude judging circuit 34 and the phase judging circuit 35 can be realized by ROMs (read only memories), in which the judgment result is stored for any combination of the I-signal 161 and the Q-signal 171.

The memory circuit 36 delays the signal 351 by one code period by holding the signal 351 during one code period. "One code period" means the period from receiving a signal 351 to receiving a next signal 351.

The code judging circuit 37 determines a value of predetermined one bit of code in accordance with the signal 341 from the amplitude judging circuit 34. When the signal 351 is currently input to the code judging circuit 37, the code judging circuit 37 reads a previous signal 361 stored in the memory circuit 36 and determines values of the remaining two bits of code in accordance with the difference between the previous signal 361 indicating the phase of the previous code point and the current signal 351 indicating the phase of the current code point. Thus, the code judging circuit 37 outputs signal 371 indicating the code of 3 bits (i.e. 8-ary code). The code judging circuit 37 can be realized by a ROM (read only memory).

Figure 8:
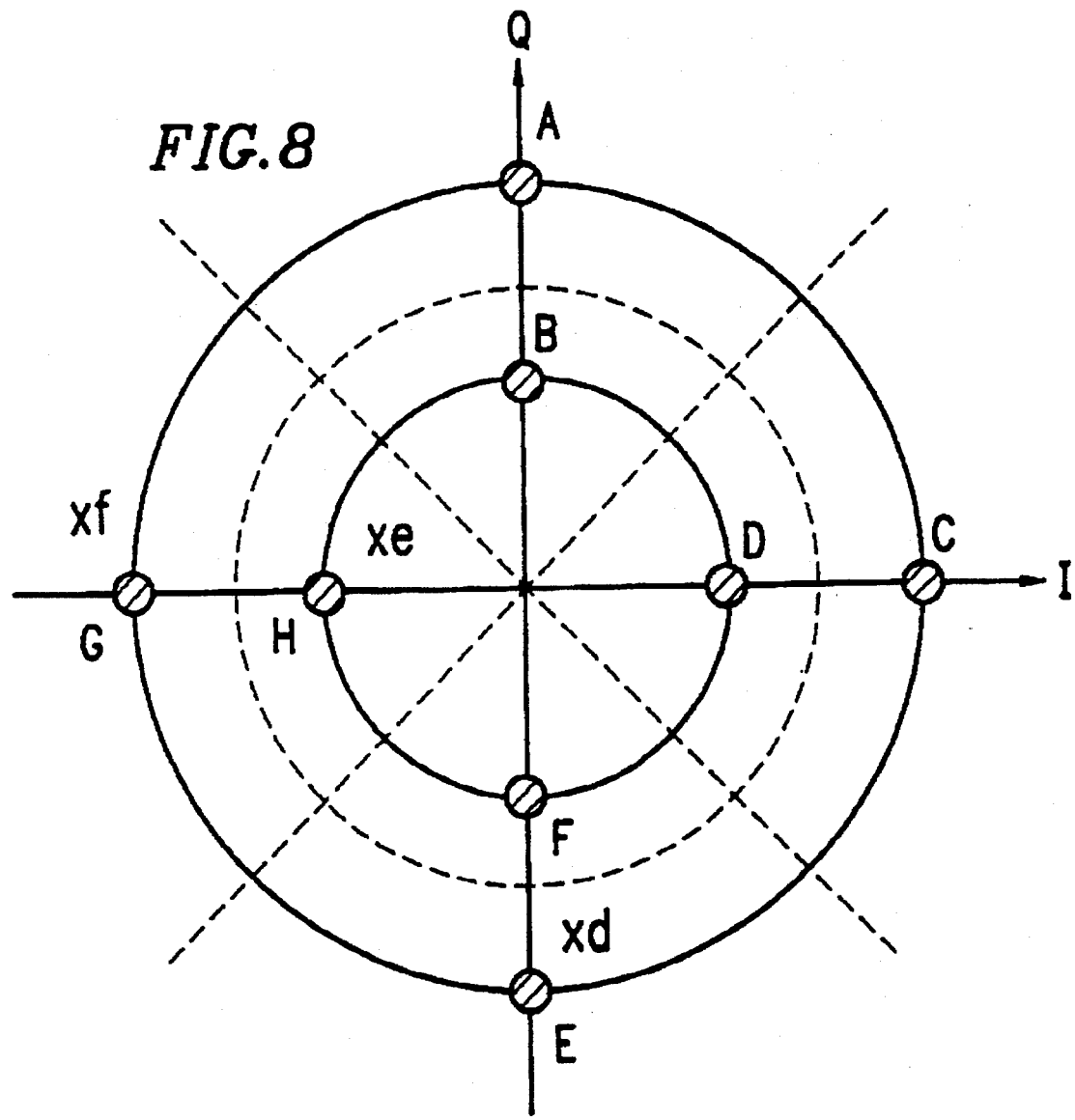
FIG. 8 is a schematic view of the division of the constellation plane into a plurality of regions.

FIG. 8 shows an example of the division of the constellation plane into a plurality of regions. In FIG. 8, the constellation plane is divided into eight regions, each of eight regions including one of eight code points (A to H) as a representative point of the region. Broken lines show borders between adjacent regions. Typically, a border between a region including a first code point and another adjacent region including a second code point is arranged so that the distance from the first code point to the border is substantially equal to the distance from the second code point to the border.

Referring to FIG. 8, operations of the amplitude judging circuit 34, the phase judging circuit 35, the memory circuit 36 and the code judging circuit 37 will be described in more detail below. It is assumed that I and Q signals representing a first signal point (d), a second signal point (e) and a third signal point (f) are input to the amplitude judging circuit 34 and the phase judging circuit 35 in this order, and that the phase of the code point stored in the memory circuit 36 is 0 degrees.

In this case, the first signal point (d) is judged to be located on the outer circle by the amplitude judging circuit 34 and the phase of the first signal point (d) is judged to be 180 degrees by the phase judging circuit 35. The code judging circuit 37 outputs a code having a value of 2, because the code corresponds to the outer circle and the phase difference is 180 degrees with respect to the phase of 0 degrees which is stored in the memory circuit 36. Then, the content of memory circuit 36 is updated into 180 degrees. The second signal point (e) is judged to be located on the inner circle by the amplitude judging circuit 34 and the phase of the second signal point (e) is judged to be 270 degrees by the phase judging circuit 35. The code judging circuit 37 outputs a code having a value of 5, because the code corresponds to the inner circle and the phase difference is 90 degrees with respect to the phase of 180 degrees which is stored in the memory circuit 36. Then, the content of memory circuit 36 is updated into 270 degrees. The third signal point (f) is judged to be located on the outer circle by the amplitude judging circuit 34 and the phase of the third signal point (f) is judged to be 270 degrees by the phase judging circuit 35. The code judging circuit 37 outputs a code having a value of 0, because the code corresponds to the outer circle and the phase difference is 0 degrees with respect to the phase of 270 degrees which is stored in the memory circuit 36.

In the present embodiment, the phase judging circuit 35 outputs a signal 351. The signal 351 indicates one of 0, 90, 180 and 270 degrees, which is closest to the phase of the signal point represented by the I-signal 161 and the Q-signal 171. Alternatively, the phase judging circuit 35 may output a signal indicating the phase of the signal point represented by the I-signal 161 and the Q-signal 171. In this case, the code judging circuit 37 outputs a code having a corresponding value, based on which one of 0, 90, 180 and 270 degrees is closest to the phase difference between the signal 351 and the signal 361.

The 8-ary code 371 (i.e. a digital signal of 3 bits) output from the code judging circuit 37 is converted into serial data 211 by a P/S converter 21. The serial data 211 is output through an output terminal 22.

In the present embodiment, the number of bits is three, and the number of code values is eight for explanation. However, it is to be understood that the number of bits and the number of code values as mentioned above are by way of example and the invention is not intended to be limited thereto.

For example, $2^N$ code points may be arranged on $2^K$ circles having the same center of the origin of the constellation plane, and adjacent code points on each circle of the $2^K$ circles may be away from each other by $(360/2^{N-K})$ degrees. Wherein, N is an integer greater than or equal to 2, K is an integer greater than or equal to 1. In this case, the mapping circuit 33 selects one of the $2^K$ circles in accordance with values of predetermined K bits of the digital signal of N bits, and maps a code having a value of M to a code point on the selected circle. The code point has a phase shifted by $(360/2^{N-K} \times M)$ degrees with respect to a code point corresponding to the previous code. Wherein, M is an integer satisfying $0 \leq M \leq 2^{N-K}-1$. The amplitude judging circuit 34 determines values of the predetermined K bits of the digital signal of N bits in accordance with the amplitude of the current signal point. The phase judging circuit 35 determines values of the remaining (N–K) bits of the digital signal of N bits in accordance with the phase difference between the previous signal point and the current signal point. The code judging circuit 37 outputs a code having a combined value of the predetermined K bits and the remaining (N–K) bits.

The digital recording/reproducing apparatus according to the present invention is obtained by adding a recoding/reproducing unit shown in FIG. 4 to the structure shown in FIG. 6.

As described above, according to the digital modulating/demodulating apparatus and the digital recording/reproducing apparatus of the third example according to the present invention, since code points are classified into two groups (the outer circle and the inner circle) based on the amplitudes of the code points, the phase difference between adjacent code points having the same amplitude is larger than that of the conventional apparatus. As a result, the error rate of the decoded data is kept extremely low even if a phase shift of the reproduced carrier, due to a jitter (fluctuation in time-axis), causes a phase shift of the signal point.

Example 4

Figure 9:
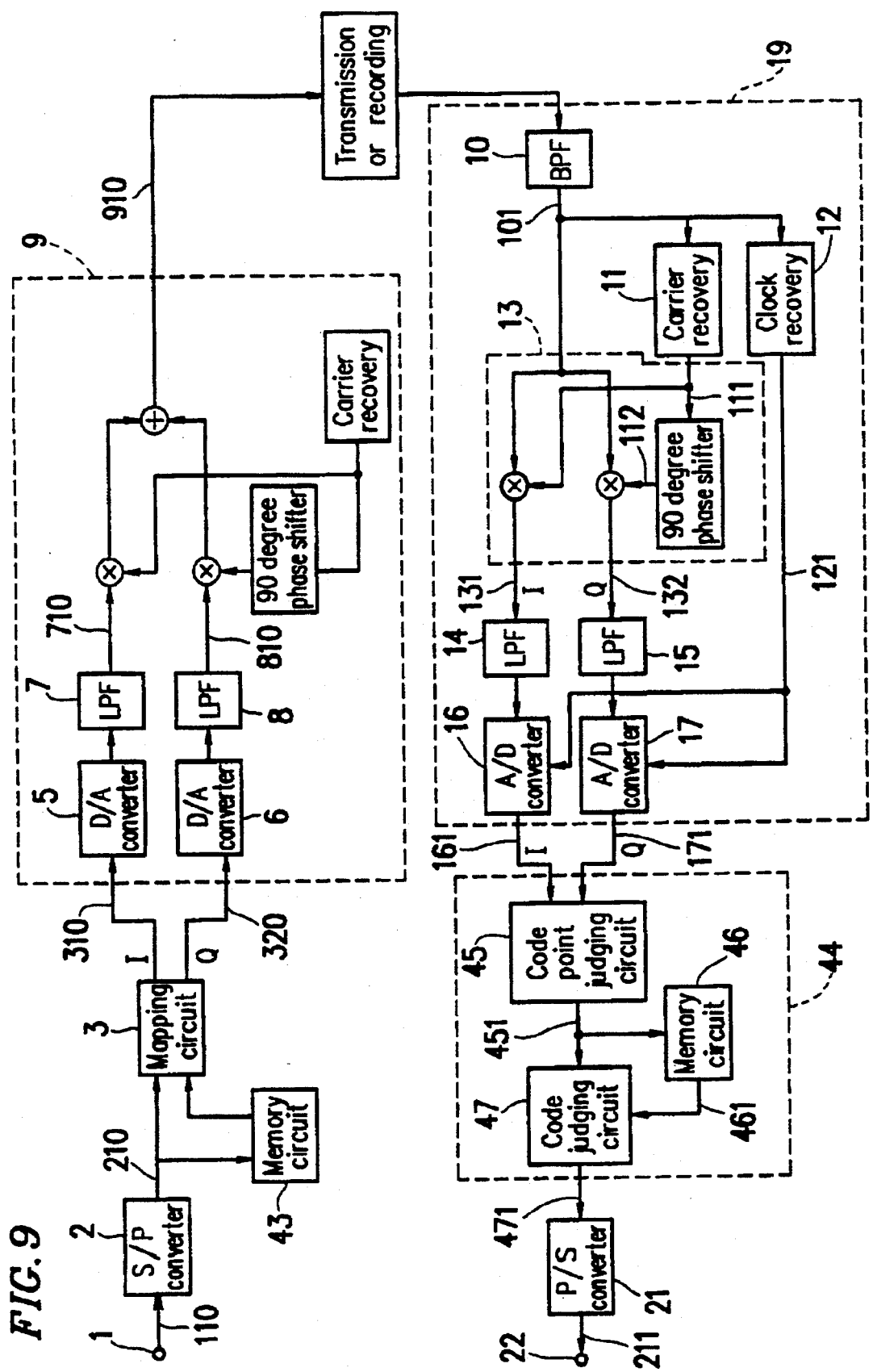
FIG. 9 is a block diagram showing the structure of a digital modulating/demodulating apparatus of a fourth example according to the present invention.

FIG. 9 shows a structure of a digital modulating/demodulating apparatus of a fourth example according to the present invention. The digital modulating/demodulating apparatus includes a modulating unit for converting a digital signal into a modulated signal and a demodulating unit for converting the modulated signal into a digital signal.

The modulating unit includes a S/P converter 2, a mapping circuit 3, a memory circuit 43 and a quadrature modulator 9.

The demodulating unit includes a demodulator 19, a decoder 44 and a P/S converter 21.

Referring to FIG. 9, an operation of the modulating/demodulating apparatus will be described below. Serial data 110 is input to the S/P converter 2 through an input terminal 1. The S/P converter 2 converts serial data 110 into parallel data 210 of 3 bits. The parallel date 210 of 3 bits (i.e. 8-ary code C(n)) is input to the mapping circuit 3. The mapping circuit 3 maps the 8-ary code C(n) to one of 8 code points (A to H) shown in FIG. 10 and outputs an I-signal and a Q-signal representing the code point to which the 8-ary code C(n) has been mapped.

Figure 10:
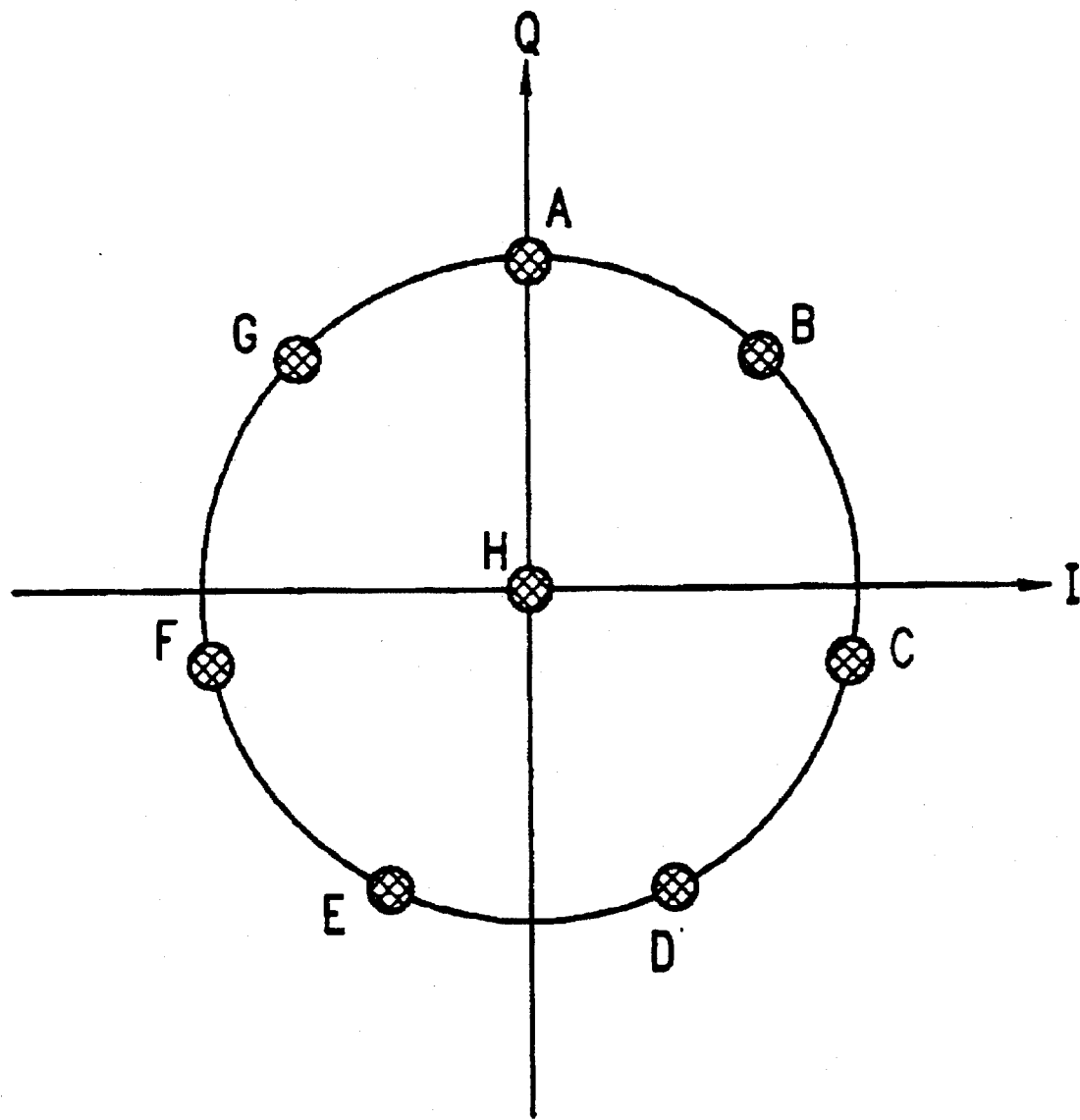
FIG. 10 is a schematic view of an arrangement of eight code points on the constellation plane in the mapping circuit.

FIG. 10 shows an example of an arrangement of eight code points on the constellation plane in the mapping circuit 3. Seven points A to G are located on a single circle with the same interval. The single circle has a center positioned on the origin of the constellation plane. The remaining one point H is located on the center of the single circle.

Table 3 shows a mapping rule for mapping the code C(n) to one of 8 code points shown in FIG. 10.

TABLE 3

| Current code C (n) | The position of code point |
|---|---|
| 0 | Code point H (origin) |
| 1 | A code point rotated in clockwise direction by 0 degree |
| 2 | A code point rotated in clockwise direction by $(360 \times 1/7)$ degree |
| 3 | A code point rotated in clockwise direction by $(360 \times 2/7)$ degree |
| 4 | A code point rotated in clockwise direction by $(360 \times 3/7)$ degree |
| 5 | A code point rotated in clockwise direction by $(360 \times 4/7)$ degree |
| 6 | A code point rotated in clockwise direction by $(360 \times 5/7)$ degree |
| 7 | A code point rotated in clockwise direction by $(360 \times 6/7)$ degree |

The rotating angle of code point is relative to a previous code having a value other than "0" most recently When a code C(n) of 3 bits having a specific value is currently input to the mapping circuit 3, the mapping circuit 3 outputs a I-signal having a value of "0" and a Q-signal having a value of "0". The I-signal and Q-signal correspond to code point H shown in FIG. 10. Hereinafter, it is assumed that the specific value of the code C(n) is "0". When a code C(n) having a value other than "0" is currently input to the mapping circuit 3, the mapping circuit 3 maps the current code C(n) to one of the code points in accordance with a code point corresponding to a previous code C(n–m) and an angle defined by a value of the current code C(n), and outputs an I-signal and a Q-signal representing the mapped code point. The previous code C(n–m) is the most recent code having a value other than "0" (where, m is an integer greater than or equal to 1 and if m is an integer greater than or equal to 2, C(n–1)=. . . =C(n–m+1)=0). The angle corresponding to the current code C(n) having a value other than "0" is shown in Table 3. A previous code C(n–m) which is the most recent code having a value other than "0" is stored in the memory circuit 43. The previous code C(n–m) stored in the memory circuit 43 and the current code C(n) are input to the mapping circuit 3 simultaneously.

For example, it is assumed that a first code having a value of 2, a second code having a value of 5, a third code having a value of 0, a fourth code having a value of 0 and a fifth code having a value of 3 are input to the mapping circuit 3 in this order and that a code previous to the first code was mapped to code point A shown in FIG. 10.

In this case, the first code is mapped to code point B, which is shifted in a clockwise direction by $(360 \times 1/7)$ degrees with respect to code point A, and an I-signal and a Q-signal representing code point B are outputted by the mapping circuit 3. The second code is mapped to code point F, which is shifted in a clockwise direction by $(360 \times 4/7)$ degrees with respect to code point B. The third and fourth codes are mapped to code point H. The fifth code is mapped to code point A, which is shifted in a clockwise direction by $(360 \times 2/7)$ degrees with respect to code point F. Code point F corresponding to the second code is a previous code which is the most recent code having a value other than "0".

The mapping circuit 3 can be realized by a ROM (read only memory), in which the levels of the I-signal and the Q-signal to be output are stored for any combination of parallel data 210 of 3 bits with the I-signal and the Q-signal read from the memory circuit 4.

The I-signal 310 and the Q-signal 320 output from the mapping circuit 3 are input to the quadrature modulator 9. In the quadrature modulator 9, the I-signal 310 and the Q-signal 320 are converted into analog signals. The analog signals 710 and 810 passed through low-pass filters 7 and 8 are amplitude modulated by the use of carriers, thereby a modulated signal 910 is generated.

The modulated signal 910 is input to a bandpass filter (BPF) 10 through a transmission path. A transmission in the transmission path is not limited to a specific transmission. For example, the transmission is made using radio communications or cable communications. The modulated signal passed through the BPF 10 is input to a carrier recovery 11, a clock recovery 12 and a quadrature detector 13.

The carrier recovery 11 generates a reproduced carrier 111 for demodulation. The clock recovery 12 generates a reproduced clock signal 121 for defining a detecting timing.

The quadrature detector 13 generates a demodulated I-signal 131 and a demodulated Q-signal 132 by quadrature detecting the modulated signal 101 by the use of the reproduced carrier 111 and a signal 112 obtained by shifting a phase of the reproduced carrier 111 by 90 degrees.

The demodulated I-signal 131 and the demodulated Q-signal 132 are input to A/D converters 16 and 17 through low-pass filters (LPFs) 14 and 15. The A/D converters 16 and 17 convert the I-signal and the Q-signal into a digital I-signal 161 and a digital Q-signal 171 in response to the reproduced clock signal 121 from clock recovery 12.

The digital I-signal 161 and the digital Q-signal 171 are input to a code point judging circuit 45 of the decoder 44.

Figure 11:
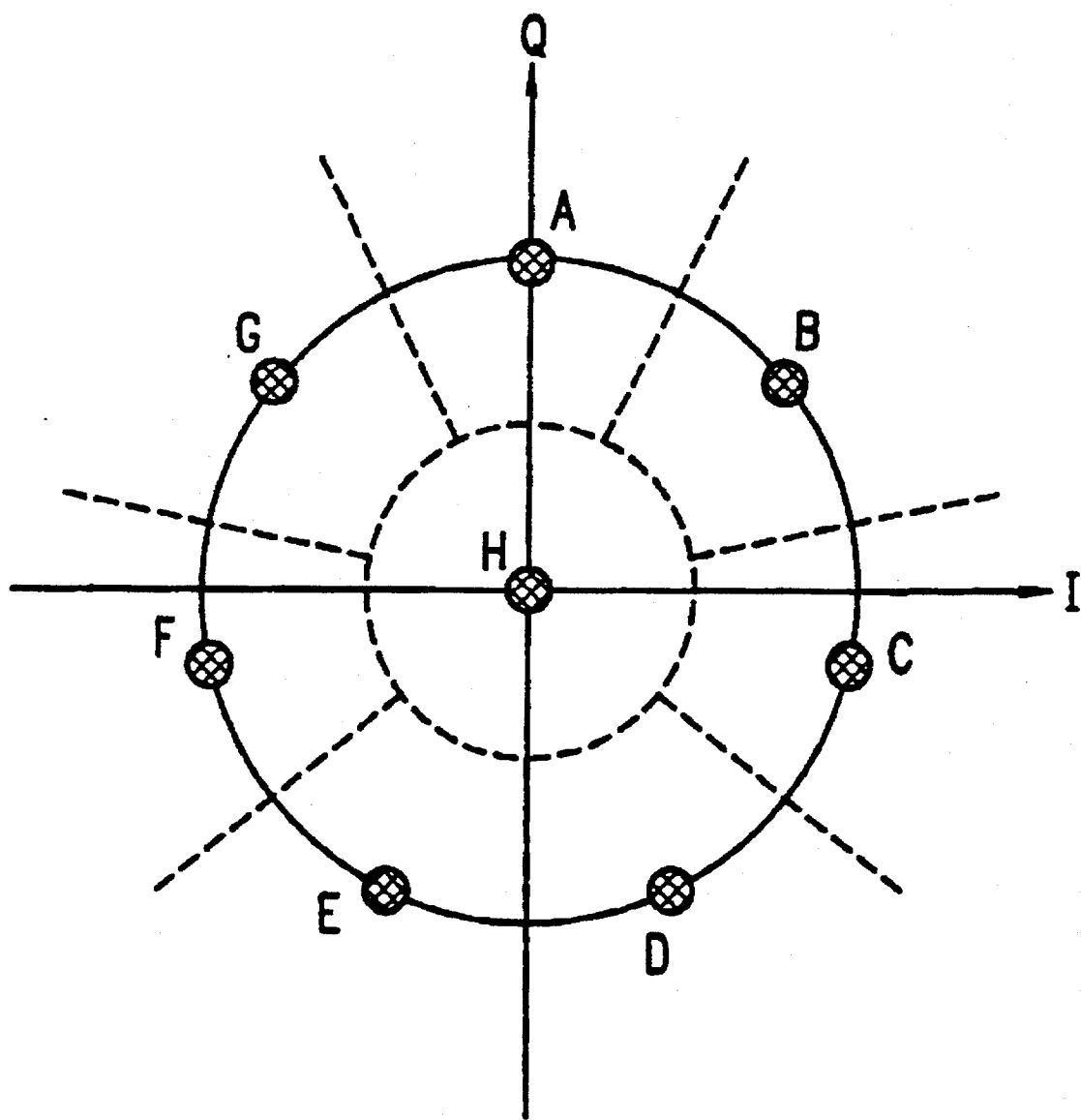
FIG. 11 is a schematic view of the division of the constellation plane into a plurality of regions.

The code point judging circuit 45 determines which one of eight code points (A to H) shown in FIG. 11 corresponds to a signal point represented by the I-signal 161 and the Q-signal 171 in accordance with the amplitude and the phase of the signal point, and outputs a signal 451 indicating the determined code point. The signal 451 from the code point judging circuit 45 is input to the memory circuit 46 and the code judging circuit 47.

The code point judging circuit 45 can be realized by a ROM (read only memory), in which the judgment result is stored for any combination of the I-signal 161 and the Q-signal 171.

The memory circuit 46 delays the signal 451 until the memory circuit 46 receives the signal 451 indicating a code point other than code point H. When the signal 451 indicating a code point other than code point H is input to the memory circuit 46, the content of the memory circuit 46 is updated into the input signal 451. Thus, the memory circuit 46 stores only the signal 451 indicating the most recent code point other than code point H.

When the signal 451 is currently input to the code judging circuit 47, the code judging circuit 47 reads a previous signal 461 stored in the memory circuit 46 and outputs a code 471 in accordance with the difference between the previous signal 461 and the current signal 451. However, if a current signal point represented by the I-signal 161 and the Q-signal 171 is judged to be code point H, the code judging circuit 47 outputs a code having a value of "0" without comparing the previous signal 461 with the current signal 451. The code judging circuit 47 can be realized by a ROM (read only memory).

Figure 12:
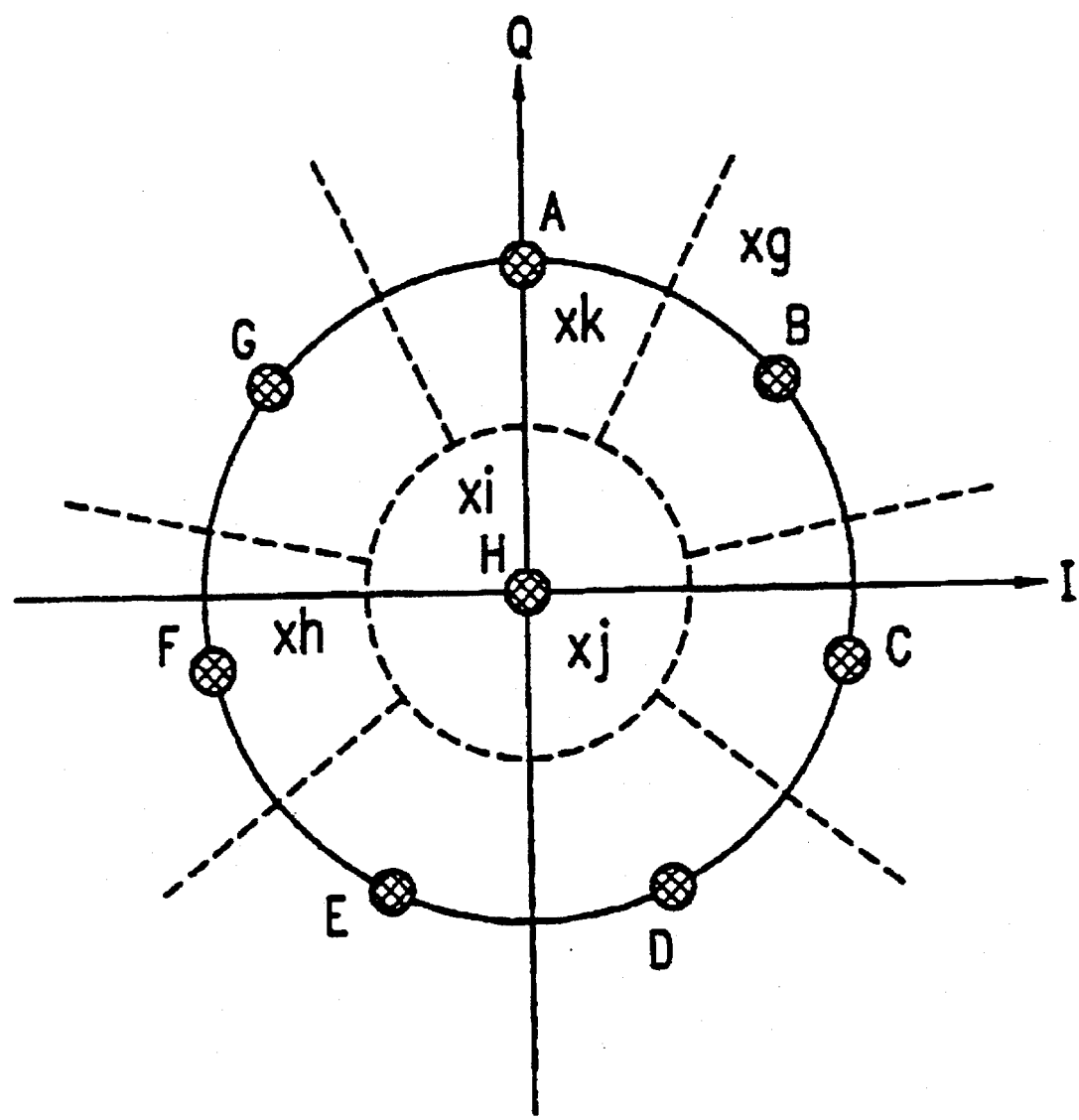
FIG. 12 is a schematic view of the division of the constellation plane into a plurality of regions.

FIG. 12 shows an example of the division of the constellation plane into a plurality of regions. In FIG. 12, the constellation plane is divided into eight regions, each of eight regions including one of eight code points (A to H) as a representative point of the region. Broken lines show borders between adjacent regions. Typically, a border between a region including a first code point and another adjacent region including a second code point is arranged so that the distance from the first code point to the border is substantially equal to the distance from the second code point to the border.

Referring to FIG. 12, operations of the code point judging circuit 45, the memory circuit 46 and the code judging circuit 47 will be described in more detail below. It is assumed that I and Q signals representing a first signal point (g), a second signal point (h), a third signal point (i), a fourth signal point (j) and a fifth signal point (k) are input to the code point judging circuit 45 in this order, and that the code point stored in the memory circuit 46 is code point A.

In this case, the first signal point (g) is judged to be code point B by the code point judging circuit 45, because the first signal point (g) is included in the same region as code point B. The code judging circuit 47 outputs a code having a value of 2, because code point B from the code point judging circuit 45 is shifted in a clockwise direction by (360×1/7) degrees with respect to code point A from the memory circuit 46. Then, the content of memory circuit 46 is updated into code point B. The second signal point (h) is judged to be code point F by the code point judging circuit 45, because the second signal point (h) is included in the same region as code point F. The code judging circuit 47 outputs a code having a value of 5, because code point F from the code point judging circuit 45 is shifted in a clockwise direction by (360×4/7) degrees with respect to code point B from the memory circuit 46. Then, the content of memory circuit 46 is updated into code point F. The third and fourth signal points (i) and (j) are judged to be code point H by the code point judging circuit 45, because the third and fourth signal points are included in the same region as code point H. The code judging circuit 47 outputs a code having a value of "0" regardless of the content of the memory circuit 46. The fifth signal point (k) is judged to be code point A by the code point judging circuit 45, because the fifth signal point (k) is included in the same region as code point A. The code judging circuit 47 outputs a code having a value of 3, because code point A from the code point judging circuit 45 is shifted in a clockwise direction by (360×2/7) degrees with respect to code point F from the memory circuit 46.

The 8-ary code 471 (i.e. a digital signal of 3 bits) output from the code judging circuit 47 is converted into serial data 211 by a P/S converter 21. The serial data 211 is output through an output terminal 22.

In the present embodiment, the number of bits is three, and the number of code values is eight for explanation. However, it is to be understood that the number of bits and the number of code values as mentioned above are by way of example and the invention is not intended to be limited thereto.

For example, one of $2^N$ code points may be arranged on the origin of the constellation plane and the remaining code points of the $2^N$ code points may be arranged on a single circle having a center of the origin of the constellation plane. In this case, the mapping circuit 3 maps a code having a specific value to a code point located at the origin of the constellation plane, and maps a code having a value of M other than the specific value to a code point having a phase shifted by $(360/(2^N-1) \times M)$ with respect to a previous code point on the single circle to which the previous code was mapped most recently. Wherein, M is an integer satisfying $0 \leq M \leq 2^N-1$. The code point judging circuit 45 judges whether the current signal point is located in a predetermined region including the origin of the constellation plane in accordance with the amplitude of the current signal point. The code judging circuit 47 outputs a code having the specific value, when it is judged that the current signal point is located in the predetermined region. Otherwise, the code judging circuit 47 outputs a code having a value other than the specific value in accordance with the phase difference between the previous code point and the current code point.

The digital recording/reproducing apparatus according to the present invention is obtained by adding a recoding/reproducing unit shown in FIG. 4 to the structure shown in FIG. 9.

As described above, according to the digital modulating/demodulating apparatus and the digital recording/reproducing apparatus of the fourth example according to the present invention, since one of the code points is located at the origin of the constellation plane and the remaining code points are located on a single circle, the phase difference between adjacent code points on the single circle is larger than that of the conventional apparatus. As a result, the error rate of the decoded date is kept extremely low even if a phase shift of the reproduced carrier, due to a jitter (fluctuation in time-axis), causes a phase shift of the signal point.

Example 5

A digital modulating/demodulating apparatus of a fifth example according to the present invention will be described below. The structure of the digital modulating/demodulating apparatus of this example is the same as that of the fourth example except for the decoder 48.

Figure 13:
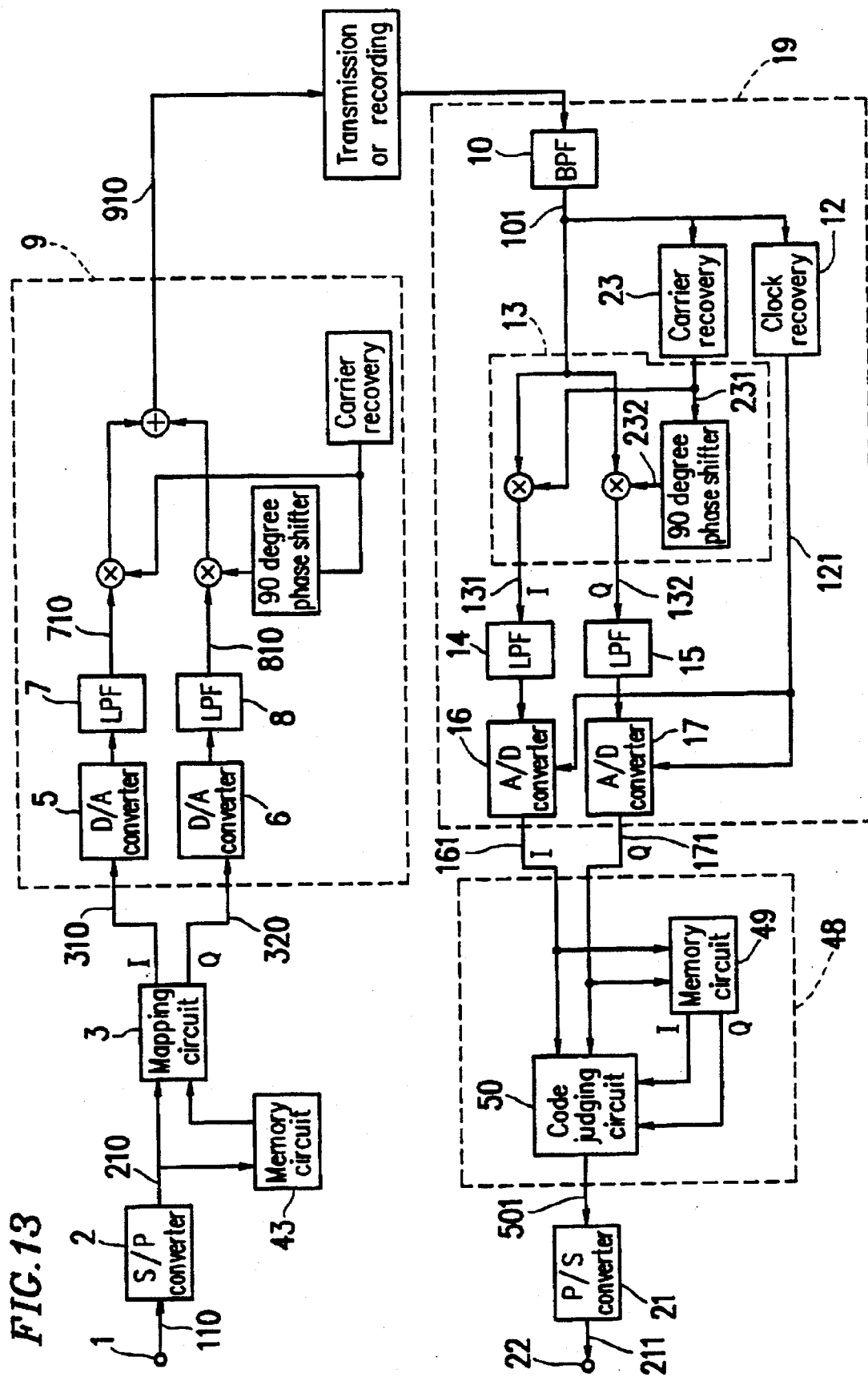
FIG. 13 is a block diagram showing the structure of a digital modulating/demodulating apparatus of a fifth example according to the present invention.

Referring to FIG. 13, the decoder 48 of this example includes a memory circuit 49 and a code judging circuit 50. The digital I-signal 161 and the digital Q-signal 171 are input to the memory circuit 49 and the code judging circuit 50. The memory circuit 49 stores a signal point represented by the digital I-signal 161 and the digital Q-signal 171. When the signal point is located outside a broken circle shown in FIG. 14, the content of the memory circuit 49 is updated into the signal point. Otherwise, the content of the memory circuit 49 is not updated into the signal point.

The code judging circuit 50 determines a code in accordance with an angle between a signal point represented by the digital I-signal 161 and the digital Q-signal 171 and the signal point stored in the memory circuit 49, and outputs a signal 501 indicating the determined code.

Table 4 shows a relationship between a rotating angle in a clockwise direction between a current signal point and the signal point stored in memory circuit 49 and a value of code. When the signal point represented by the digital I-signal 161 and the digital Q-signal 171 is located inside a broken-line circle shown in FIG. 14, a code corresponding to the signal point is judged to be "0" without comparing the signal point with the signal point stored in the memory circuit 49.

TABLE 4

| Rotating angle (clockwise direction) | judged code |
| --- | --- |
| −360/14 ~ 360/14 | 1 |
| 360/14 ~ 3 × 360/14 | 2 |
| 3 × 360/14 ~ 5 × 360/14 | 3 |
| 5 × 360/14 ~ 7 × 360/14 | 4 |
| 7 × 360/14 ~ 9 × 360/14 | 5 |
| 9 × 360/14 ~ 11 × 360/14 | 6 |
| 11 × 360/14 ~ 13 × 360/14 | 7 |

Figure 14:
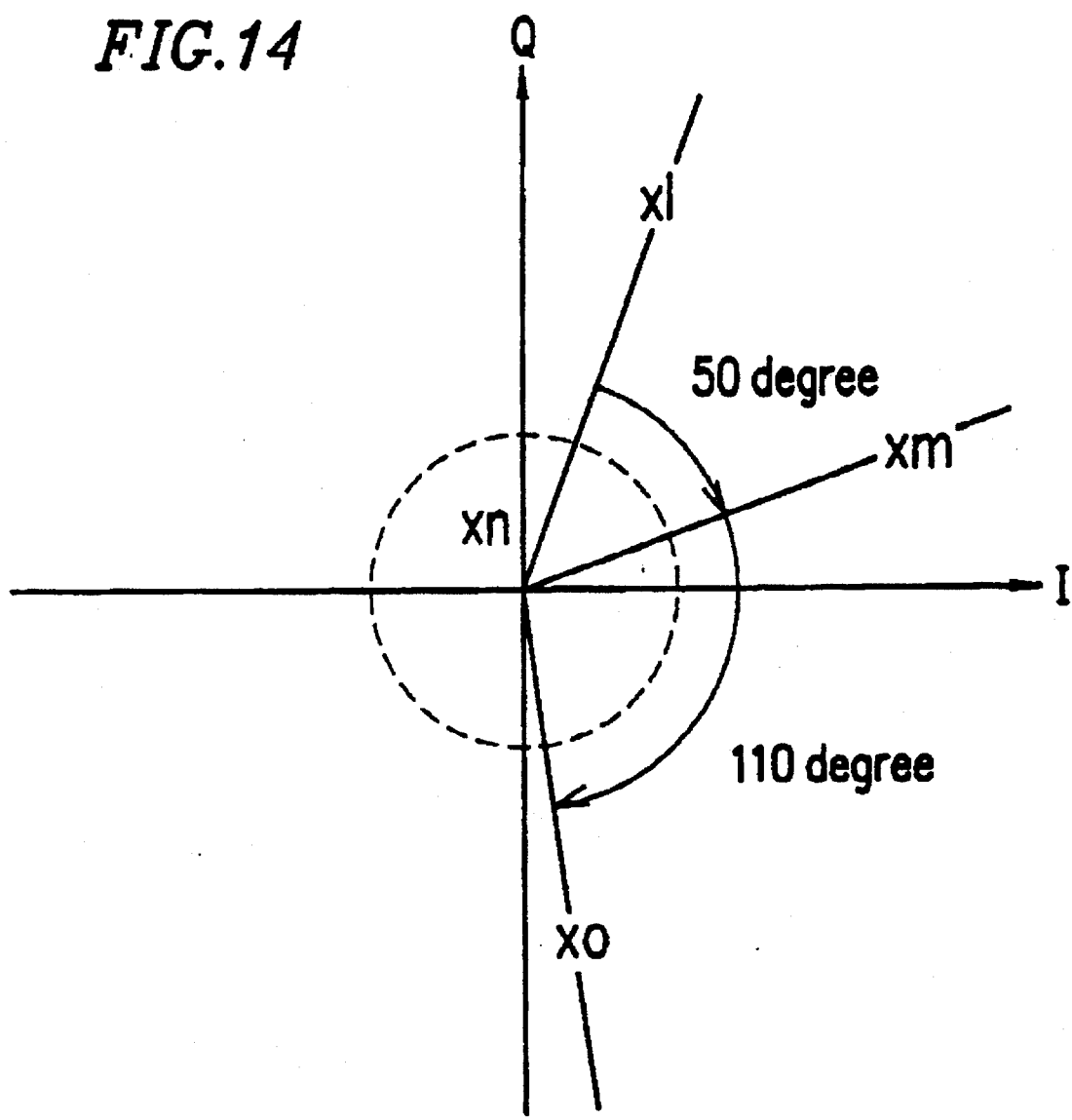
FIG. 14 is a schematic view of the division of the constellation plane into an outer region and an inner region.

FIG. 14 shows an example of the division of the constellation plane into an outer region and an inner region. The outer region is defined as a region outside a predetermined circle indicated by a broken line. The inner region is defined as a region inside the predetermined circle and including the origin. The broken-line circle is used to define a neighborhood of the origin.

Referring to FIG. 14, operations of the memory circuit 49 and the code judging circuit 50 will be described in more detail below. It is assumed that I and Q signals representing a first signal point (m), a second signal point (n) and a third signal point (o) are input to the code judging circuit 50 in this order, and that the signal point stored in the memory circuit 49 is a signal point (l).

In this case, the first signal point (m) is judged to be a code having a value of 2 by the code judging circuit 50, because the first signal point (m) is located in the outer region and is shifted in a clockwise direction by 50 degrees with respect to the signal point (l). Then, the content of the memory circuit 49 is updated into the signal point (m). The second signal point (n) is judged to be a code having a value of 0 by the code judging circuit 50, because the second signal point (n) is located in the inner region. The content of the memory circuit 49 is not updated into the signal point (n). The third signal point (o) is judged to be a code having a value of 3 by the code judging circuit 50, because the third signal point (o) is located in the outer region and is shifted in a clockwise direction by 110 degrees with respect to the signal point (m).

The code judging circuit 50 can be realized by a ROM (read only memory), in which the judgment result is stored for any combination of the I-signal 161 and the Q-signal 171.

The 8-ary code 501 (i.e. a digital signal of 3 bits) output from the code judging circuit 50 is converted into serial data 211 by a P/S converter 21. The serial data 211 is output through an output terminal 22.

In the present embodiment, the number of bits is three, and the number of code values is eight for explanation. However, it is to be understood that the number of bits and the number of code values as mentioned above are by way of example and the invention is not intended to be limited thereto.

The digital recording/reproducing apparatus according to the present invention is obtained by adding a recoding/reproducing unit shown in FIG. 4 to the structure shown in FIG. 13.

As described above, according to the digital modulating/demodulating apparatus and the digital recording/reproducing apparatus of the fifth example according to the present invention, since one of the code points is located at the origin of the constellation plane and the remaining code points are located on a single circle, the phase difference between adjacent code points on the single circle is larger than that of the conventional apparatus. As a result, the error rate of the decoded data is kept extremely low even if a phase shift of the reproduced carrier, due to a jitter (fluctuation in time-axis), causes a phase shift of the signal point. Furthermore, the signal point is not coupled to one of the code points in the decoder. Instead, a code is determined in the decoder, based on relative changes in phase and amplitude between the previous signal point and the current signal point. As a result, the error rate of the decoded date is kept extremely low even if the reproduced carrier is unusual.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A digital modulating/demodulating apparatus comprising:

encoding means for outputting a code having a value in response to a digital signal of N bits, a previous code and a current code being output from said encoding means in this order, wherein N is an integer satisfying $N \geq 1$;

mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;

quadrature modulating means for modulating said positional signal into a modulated signal;

demodulating means for demodulating said modulated signal into a demodulated positional signal in response to a receipt of said modulated signal, said demodulating means providing as an output a previous demodulated positional signal and a current demodulated positional signal in this order; and decoding means for decoding said demodulated positional signal into a digital signal of N bits;

wherein a previous signal point on said constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point, said $2^N$ code points are arranged on a plurality of circles having the same center of origin of said constellation plane, adjacent code points of said $2^N$ code points on each circle being away from each other by an angle greater than $(360/2^N)$ degrees, and said mapping means maps a code having a value of M to a code point having a phase shifted by $(360/2^N \times M)$ degrees with respect to a code point corresponding to said previous code, and M is an integer satisfying $0 \leq M \leq 2^N - 1$, wherein said decoding means comprises:

means for determining a previous code point corresponding to said previous signal point in accordance with said amplitude and said phase of said previous signal point and for determining a current code point corresponding to said current signal point in accordance with said amplitude and said phase of said current signal point; and means for outputting a code in accordance with a phase difference between said previous code point and said current code point.

2. An apparatus according to claim 1, wherein N is three, said plurality of circles includes an inner circle having a small radius and an outer circle having a large radius, four code points of eight code points are arranged on said outer circle at 0, 90, 180 and 270 degrees and the remaining four code points are arranged on said inner circle at 45, 135, 225 and 315 degrees.

3. An apparatus according to claim 1, wherein said modulated signal output from said quadrature modulating means is supplied to said demodulating means through a transmission path.

4. A digital modulating/demodulating apparatus comprising:

encoding means for outputting a code having a value in response to a digital signal of N bits, a previous code and a current code being output from said encoding means in this order, wherein N is an integer satisfying $N \geq 1$;

mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;

quadrature modulating means for modulating said positional signal into a modulated signal;

demodulating means for demodulating said modulated signal into a demodulated positional signal in response to a receipt of said modulated signal, said demodulating means providing as an output a previous demodulated positional signal and a current demodulated positional signal in this order: and decoding means for decoding said demodulated positional signal into a digital signal of N bits;

wherein a previous signal point on said constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point, and said decoding means comprises:

determining means for determining one of said $2^N$ code points corresponding to a signal point defined by said demodulated positional signal in accordance with an amplitude and a phase of said signal point, and for outputting a signal indicating a position of said determined code point, a previous code point corresponding to said previous signal point and a current code point corresponding to said current signal point being determined, and a previous signal indicating a position of said previous code point being output from said determining means in this order;

memory means for storing said previous signal until said current signal is output from said determining means; and output means for receiving said previous signal from said memory means and said current signal from said determining means, for outputting a digital signal of N bits in accordance with said previous signal and said current signal.

5. A digital modulating/demodulating apparatus comprising:

encoding means for outputting a code having a value in response to a digital signal of N bits, a previous code and a current code being output from said encoding means in this order, wherein N is an integer satisfying $N \geq 1$;

mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;

quadrature modulating means for modulating said positional signal into a modulated signal;

demodulating means for demodulating said modulated signal into a demodulated positional signal in response to a receipt of said modulated signal, said demodulating means providing as an output a previous demodulated positional signal and a current demodulated positional signal in this order; and decoding means for decoding said demodulated positional signal into a digital signal of N bits;

wherein a previous signal point on said constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point, and said decoding means comprises:
- determining means for determining a signal point defined by said demodulated positional signal in accordance with an amplitude and a phase of said signal point, and for outputting a signal indicating a position of said determined signal point, a previous signal indicating a position of said previous signal point and a current signal indicating a position of said current signal point being output from said determining means in this order:
  - memory means for storing said previous signal until said current signal is output from said determining means; and
  - output means for receiving said previous signal from said memory means and said current signal from said determining means, for outputting a digital signal of N bits in accordance with said previous signal and said current signal.

6. A digital modulating/demodulating apparatus comprising:

encoding means for outputting a code having a value in response to a digital signal of N bits, a previous code and a current code being output from said encoding means in this order, wherein N is an integer satisfying $N \geq 1$;

mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;

quadrature modulating means for modulating said positional signal into a modulated signal;

demodulating means for demodulating said modulated signal into a demodulated positional signal in response to a receipt of said modulated signal, said demodulating means providing as an output a previous demodulated positional signal and a current demodulated positional signal in this order; and decoding means for decoding said demodulated positional signal into a digital signal of N bits;

wherein a previous signal point on said constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point, N is an integer satisfying $N \geq 2$, said $2^N$ code points are arranged on $2^K$ circles having the same center of the origin of said constellation plane, adjacent code points on each circle of said $2^K$ circles being away from each other by $(360/2^{N-K})$ degrees, K is an integer satisfying $K \geq 1$, said mapping means selects one of said $2^K$ circles in accordance with values of predetermined K bits of said digital signal of N bits, and maps a code having a value of M to a code point on said selected circle, said code point having a phase shifted by $(360/2^{N-K} \times M)$ degrees with respect to a code point corresponding to said previous code, and M is an integer satisfying $0 \leq M \leq 2^{N-K}-1$, and said decoding means comprises:
- means for determining values of said predetermined K bits of said digital signal of N bits in accordance with said amplitude of said current signal point;
- means for determining values of the remaining (N−K) bits of said digital signal of N bits in accordance with a phase difference between said previous signal point and said current signal point; and
- means for outputting a code having a combined value of said predetermined K bits and said remaining (N−K) bits.

7. An apparatus according to claim 6, wherein N is three, K is 1, said plurality of circles includes an inner circle having a small radius and an outer circle having a large radius, four code points of eight code points are arranged on said outer circle at 0, 90, 180 and 270 degrees and the remaining four code points are arranged on said inner circle at 0, 90, 180 and 270 degrees.

8. A digital modulating/demodulating apparatus comprising:

encoding means for outputting a code having a value in response to a digital signal of N bits, a previous code and a current code being output from said encoding means in this order, wherein N is an integer satisfying $N \geq 1$;

mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;

quadrature modulating means for modulating said positional signal into a modulated signal;

demodulating means for demodulating said modulated signal into a demodulated positional signal in response to a receipt of said modulated signal, said demodulating means providing as an output a previous demodulated positional signal and a current demodulated positional signal in this order; and decoding means for decoding said demodulated positional signal into a digital signal of N bits;

wherein a previous signal point on said constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point, one of said $2^N$ code points is arranged on the origin of said constellation plane and the remaining code points of said $2^N$ code points are arranged on a single circle having a center of the origin of said constellation plane, said mapping means maps a code having a specific value to a code point located at the origin of said constellation plane, and maps a code having a value of M other than said specific value to a code point having a phase shifted by $(360/(2^N-1)\times M)$ with respect to a previous code point on said single circle to which said previous code was mapped most recently, M is an integer satisfying $0 \leq M \leq 2^N-1$, and said decoding means comprises:
  means for judging whether said current signal point is located in a predetermined region including the origin of said constellation plane in accordance with said amplitude of said current signal point;
  means for outputting a code having said specific value, when it is judged that said current signal point is located in said predetermined region, and for outputting a code having a value other than said specific value in accordance with the phase difference between said previous signal point and said current signal point, when it is judged that said current signal point is not located in said predetermined region.

9. An apparatus according to claim 8, wherein N is three, one of eight code points is arranged on said origin, the remaining seven code points are arranged on said single circle at 0, (360/7×1), (360/7×2), (360/7×3), (360/7×4), (360/7×5) and (360/7×6) degrees.

10. A digital modulating/demodulating apparatus comprising:
  encoding means for outputting a code having a value in response to a digital signal of N bits, a previous code and a current code being output from said encoding means in this order, wherein N is an integer satisfying $N \geq 1$;
  mapping means for mapping said current code to one of $2^N$ code points arranged on at least one circle having the same center of origin of a constellation plane in accordance with a code point corresponding to said previous code and a value of said current code, and for outputting a positional signal indicating a position of a code point mapped by said mapping means;
  quadrature modulating means for modulating said positional signal into a modulated signal;
  demodulating means for demodulating said modulated signal into a demodulated positional signal in response to a receipt of said modulated signal, said demodulating means providing as an output a previous demodulated positional signal and a current demodulated positional signal in this order;
  decoding means for decoding said demodulated positional signal into a digital signal of N bits;
  wherein a previous signal point on said constellation plane is defined by said previous demodulated positional signal, a current signal point on said constellation plane is defined by said current demodulated positional signal, and said previous and current signal points each has an amplitude and a phase,
  said decoding means outputs a digital signal of N bits, based on said amplitude and said phase of said previous signal point and said amplitude and said phase of said current signal point; and
  further comprising superposing means for superposing a bias signal on said modulated signal;
  recording means for recording said modulated signal superposed by said superposed means on a magnetic recording medium; and
  reproducing means for reproducing said modulated signal recorded on said magnetic recording medium.

11. A digital demodulating apparatus comprising:
  demodulating means for demodulating a modulated signal into a demodulated positional signal in response to a receipt of said modulated signal, said demodulating means providing as an output a previous demodulated positional signal and a current demodulated positional signal in this order; and
  decoding means for decoding said demodulated positional signal into a digital signal of N bits, N being an integer satisfying $N \geq 1$;
  wherein a previous signal point on a constellation plane is defined by said previous demodulated positional signal, a current signal point on said constellation plane is defined by said current demodulated positional signal, and said previous and current signal points each has an amplitude and a phase,
  said decoding means outputs a digital signal of N bits, based on said amplitude and said phase of said previous signal point and said amplitude and said phase of said current signal point; and
  said decoding means comprises:
    means for determining values of predetermined K bits of said digital signal of N bits in accordance with said amplitude of said current signal point;
    means for determining values of the remaining (N−K) bits of said digital signal of N bits in accordance with the phase difference between said previous signal point and said current signal point; and
    means for outputting a code having a combined value of said predetermined K bits and said remaining (N−K) bits.

12. An apparatus according to claim 11, wherein N is three, K is 1, said plurality of circles includes an inner circle having a small radius and an outer circle having a large radius, four code points are arranged on said outer circle at 0, 90, 180 and 270 degrees and the remaining four code points are arranged on said inner circle at 0, 90, 180 and 270 degrees.

13. An apparatus according to claim 11, further comprising reproducing means for reproducing a modulated signal recorded on a magnetic recording medium, and wherein said modulated signal is supplied to said demodulating means.

14. A digital demodulating apparatus comprising:
  demodulating means for demodulating a modulated signal into a demodulated positional signal in response to a receipt of said modulated signal, said demodulating means providing as an output a previous demodulated positional signal and a current demodulated positional signal in this order; and
  decoding means for decoding said demodulated positional signal into a digital signal of N bits, N being an integer satisfying $N \geq 1$;
  wherein a previous signal point on a constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point; and said decoding means comprises:
determining means for determining a code point of $2^N$ code points arranged on at least one circle having the same center of the origin of said constellation plane, said code point corresponding to a signal point defined by said demodulated positional signal, in accordance with an amplitude and a phase of said signal point, and for outputting a signal indicating a position of said determined code point, a previous code point corresponding to said previous signal point and a current code point corresponding to said current signal point being determined, and a previous signal indicating a position of said previous code point and a current signal indicating a position of said current code point being output from said determining means in this order;
memory means for storing said previous signal until said current signal is output from said determining means; and
output means for receiving said previous signal from said memory means and said current signal from said determining means, for outputting a digital signal of N bits in accordance with said previous signal and said current signal.

15. An apparatus according to claim 14, wherein said $2^N$ code points are arranged on a plurality of circles having the same center of origin of said constellation plane, adjacent code points of said $2^N$ code points on each circle being away from each other by an angle grater than $(360/2^N)$ degrees, and wherein said decoding means comprises:
means for determining a previous code point corresponding to said previous signal point in accordance with said amplitude and said phase of said previous signal point and for determining a current code point corresponding to said current signal point in accordance with said amplitude and said phase of said current signal point; and
means for outputting a code in accordance with the phase difference between said previous code point and said current code point.

16. An apparatus according to claim 15, wherein N is three, said plurality of circles includes an inner circle having a small radius and an outer circle having a large radius, four code points are arranged on said outer circle at 0, 90, 180 and 270 degrees and the remaining four code points are arranged on said inner circle at 45, 135, 225 and 315 degrees.

17. A digital demodulating apparatus comprising:
demodulating means for demodulating a modulated signal into a demodulated positional signal in response to a receipt of said modulated signal, said demodulating means providing as an output a previous demodulated positional signal and a current demodulated positional signal in this order; and
decoding means for decoding said demodulated positional signal into a digital signal of N bits, N being an integer satisfying $N \geq 1$;
wherein a previous signal point on a constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point; and said decoding means comprises:
determining means for determining a signal point defined by said demodulated positional signal in accordance with an amplitude and a phase of said signal point, and for outputting a signal indicating a position of said determined signal point, a previous signal indicating a position of said previous signal point and a current signal indicating a position of said current signal point being output from said determining means in this order;
memory means for storing said previous signal until said current signal is output from said determining means; and
output means for receiving said previous signal from said memory means and said current signal from said determining means, for outputting a digital signal of N bits in accordance with said previous signal and said current signal.

18. A digital demodulating apparatus comprising:
demodulating means for demodulating a modulated signal into a demodulated positional signal in response to a receipt of said modulated signal, said demodulating means providing as an output a previous demodulated positional signal and a current demodulated positional signal in this order; and
decoding means for decoding said demodulated positional signal into a digital signal of N bits, N being an integer satisfying $N \geq 1$;
wherein a previous signal point on a constellation plane is defined by said previous demodulated positional signal, a current signal point on said constellation plane is defined by said current demodulated positional signal, and said previous and current signal points each has an amplitude and a phase, said decoding means outputs a digital signal of N bits, based on said amplitude and said phase of said previous signal point and said amplitude and said phase of said current signal point; and said decoding means comprises:
means for judging whether said current signal point is located in a predetermined region including the origin of said constellation plane in accordance with said amplitude of said current signal point; and
means for outputting a code having a specific value, when it is judged that said current signal point is located in said predetermined region, and for outputting a code having a value other than said specific value in accordance with the phase difference between said previous signal point and said current signal point, when it is judged that said current signal point is not located in said predetermined region.

19. An apparatus according to claim 18, wherein N is three, one of eight code points is arranged on said origin, the remaining seven code points are arranged on said single circle at 0, $(360/7 \times 1)$, $(360/7 \times 2)$, $(360/7 \times 3)$, $(360/7 \times 4)$, $(360/7 \times 5)$ and $(360/7 \times 6)$ degrees.

* * * * *